US009105240B2

(12) United States Patent
Chou

(10) Patent No.: US 9,105,240 B2
(45) Date of Patent: Aug. 11, 2015

(54) STRUCTURE OF LIGHT EMITTING DEVICE ARRAY AND DRIVE METHOD FOR DISPLAY LIGHT SOURCE

(76) Inventor: Chen-Jean Chou, New City, NY (US)

( * ) Notice: Subject to any disclaimer, the term of this patent is extended or adjusted under 35 U.S.C. 154(b) by 757 days.

(21) Appl. No.: 12/773,947

(22) Filed: May 5, 2010

(65) Prior Publication Data

US 2010/0283938 A1 Nov. 11, 2010

Related U.S. Application Data

(60) Provisional application No. 61/176,887, filed on May 9, 2009.

(51) Int. Cl.

*G02F 1/1335* (2006.01)
*G09G 3/34* (2006.01)
*G09G 3/36* (2006.01)

(52) U.S. Cl.

CPC ............ *G09G 3/3406* (2013.01); *G09G 3/3648* (2013.01); *G09G 2320/0646* (2013.01)

(58) Field of Classification Search

CPC .................... G09G 2320/0646; G09G 3/3406; G09G 3/3648
USPC ............................ 345/204, 102, 87, 690–691
See application file for complete search history.

(56) References Cited

U.S. PATENT DOCUMENTS

| | | | | |
|---|---|---|---|---|
| 6,285,346 | B1 * | 9/2001 | Melnik et al. | 345/87 |
| 2002/0080127 | A1 * | 6/2002 | Park et al. | 345/204 |
| 2002/0149576 | A1 * | 10/2002 | Tanaka et al. | 345/204 |
| 2003/0034946 | A1 * | 2/2003 | Liang et al. | 345/89 |
| 2004/0169631 | A1 * | 9/2004 | Tanaka et al. | 345/96 |
| 2005/0007389 | A1 * | 1/2005 | Kumamoto et al. | 345/690 |
| 2007/0176883 | A1 * | 8/2007 | Hsu et al. | 345/102 |
| 2007/0182701 | A1 * | 8/2007 | Kim et al. | 345/102 |
| 2008/0100645 | A1 * | 5/2008 | Nitta | 345/690 |
| 2008/0170054 | A1 * | 7/2008 | Chou | 345/205 |
| 2009/0021469 | A1 * | 1/2009 | Yeo et al. | 345/102 |
| 2010/0097308 | A1 * | 4/2010 | De Greef | 345/102 |
| 2010/0289833 | A1 * | 11/2010 | Budzelaar et al. | 345/690 |

* cited by examiner

*Primary Examiner* — Quan-Zhen Wang
*Assistant Examiner* — Tony Davis

(57) ABSTRACT

Array of light emitting device is provided as the backlight for a display apparatus. A control means and drive method are provided utilizing a multiple scan selection drive scheme and a relaxation operation to eliminate the flicker and to enhance the speed of LC response and contrast ratio.

29 Claims, 14 Drawing Sheets

| Input | | | | Output | | | |
|---|---|---|---|---|---|---|---|
| ClrBAR | Clock | A | B | QA | QB | ... | QH |
| L | X | X | X | L | L | | L |
| H | H | X | X | L | QAn | | QGn |
| H | ↑ | H | H | H | QAn | | QGn |
| H | ↑ | L | X | L | QAn | | QGn |
| H | ↑ | X | L | L | QAn | | QGn |

Figure 11 (Prior Art)

| Input | | | | | Output | | | |
|---|---|---|---|---|---|---|---|---|
| ClrBAR | Act All | Clock | A | B | QA | QB | ... | QH |
| L | L | X | X | X | L | L | | L |
| H | L | ↑ | X | X | L | QAn | | QGn |
| H | L | ↑ | H | H | H | QAn | | QGn |
| H | L | ↑ | L | X | L | QAn | | QGn |
| H | L | ↑ | X | L | L | QAn | | QGn |
| X | H | X | X | X | H | H | H | H |

Figure 12

STRUCTURE OF LIGHT EMITTING DEVICE ARRAY AND DRIVE METHOD FOR DISPLAY LIGHT SOURCE

CROSS REFERENCE TO RELATED APPLICATIONS

The present application claims priority of U.S. Provisional Patent Application No. 61/176,887, filed on May 9, 2009, which is hereby incorporated by reference.

BACKGROUND OF THE INVENTION

1. Field of the Invention

The present invention relates to an image display apparatus and a drive method to operate the display apparatus. The display apparatus comprises a light source and a light modulator that modulates the light from the light source to produce images. The display apparatus further comprises a control means for operating the light source and the light modulator. The control means operates the light source and the light modulator in coordination, and in such a manner that enhances the response time of the light modulator. Furthermore, the light source comprises light emitting elements with response time substantially faster than the relaxation time of the light modulator, and is operated in such a manner that eliminates the adverse effects from switching the light modulator.

2. Description of the Prior Art

A liquid crystal display (LCD) produces images by modulating light with a plurality of spatially distributed LC cells. Like other light valves such MEMS, a liquid crystal (LC) cell is a light valve that modulates light directed thereto, where the modulation controls the amount of light delivered to the viewer. Using the LC display (LCD) as an example, the images are displayed by setting the liquid crystal cells to various gray levels according to the spatial distribution of the brightness and color in the images. Each cell represents a spatial and color point in the image. Accordingly, in displaying motion pictures, the LC cells are set in such a manner that the light directed thereto is modulated to replicate the temporal and spatial image in brightness and color.

In displaying motion pictures, the cell setting is updated at a rate equal or faster than the refreshing rate of the picture images. Accordingly, a response of the LC cell slower than the rate of refreshing the images results in various types of distortion and artifacts in images, such as color breakups, trailing of a moving object, flicker and etc.

Furthermore, the current LC display relies on the color filters to produce color images. Each color filter inhibits the transmission of the other colors. For example, the green light is blocked by red and blue color filters, and thus the green light does not reach the light valves of red and blue pixels. Consequently, in a color display where display cells are structured with three primary colors, the efficiency of light utilization due to the color filter alone drops to below 30%. An alternative is to structure the display without color filters and operate the display by sequentially displaying the color image components corresponding to different colors in time, thereby producing a time-integrated replication of the input color images. In the conventional practice of such color-sequential drive scheme, the LC cells are operated at a speed three times faster than that of LC cells operated with three color filters are used. Typical liquid crystal cell structures used in consumer direct-view displays have a cell gap near 5 micrometers and an intrinsic response time above 8 milliseconds; the response time is much longer when the action is directed toward a relaxation. Such response time is not sufficient for operating an acceptable time-integration of color sequenced images which requires a response time on the order of 1 ms or faster. Consequently, sequencing three colors in time is not yet a viable solution to improve the light and power efficiency in such applications. Other proposed schemes such as using two-color sequence also result in images compromising in quality or suffering inherent color deficiency at various situations and picture types.

The present invention provides an apparatus and method to improve or eliminate the aforementioned artifacts and distortion, and to provide a method to operate the LC cells at a faster intrinsic response time. Accordingly, direct viewing LC display may be constructed with reduced color filter and operated at an improved efficiency.

As the response is generally slower from a charged state to a relaxed state than in the opposite direction in many light valves, such as LC cells and MEMS, the present invention is directed to the application to the light valves in general, with LC cell as a preferred embodiment for the purpose of illustration in this specification.

SUMMARY OF THE INVENTION

The present invention provides a display apparatus comprising a light source and a plurality of light valves, wherein the response time of the light source is faster than the response of the light valves. A preferred embodiment of such light source is a plurality of light emitting diodes (LED). A preferred embodiment of the light valves is an array of liquid crystal (LC) cells for the purpose for illustration. The light source may comprise multiple lighting elements wherein each lighting element may be switched independently. The light source may also be constructed in a way that the lighting elements are arranged in groups, where all elements in one group is switched on and off together. The display device displays images according to input image signals. The present invention further comprises a control device controlling the output light intensity of the light source and the transmission of the LC cells in synchronism.

In a preferred embodiment, a device comprises a plurality of light valves (LC cells) wherein a relaxed state of a said light valve corresponds to a bright state at which the LC cell allows the light to pass to the viewing side.

In another preferred embodiment, a display device comprises a plurality of light valves and a plurality of light emitting devices wherein a signal s1 in operation step 1) sets all of said light emitting elements to a dimming state, and wherein a signal s2 in operation step 2) sets all light valves to a higher transmission state, wherein s1 is no later than the light valves change to transmission state by s2.

In one preferred embodiment, the LC cells are constructed in an orientation that the relaxed state corresponds to the bright state that allows the highest degree of transmission of light to the viewing side. Such preferred embodiment is the prevailing construction of liquid crystal display cells.

The present invention provides a display apparatus with LC cells operated in a manner that a cell of the display is first set to a relaxed state, thereafter set to the state to replicate the image according to input image. In an operation of setting a LC cell to the relaxed state, a control signal enabling the writing of data is applied to a group of LC cells for receiving the input data; such enabling operation may be performed by applying a select signal to the scan electrode connected to the cells thereby turning on a transistor in a pixel circuit that connects to the data electrode. During the time the cell is enabled, all data electrodes are set to a level corresponding to a relaxed state, thereby applying the signal corresponding to the relaxed state to all the selected cells. In an example of the embodiment, the group of LC cells corresponds to a row of LC cells. In an alternative embodiment, said group of LC cells comprise a section of rows of LC cells. In yet another alternative embodiment, said group of LC cells comprises the entire cells of the display.

In coordination with setting the LC cells to the relaxed state, the light source illuminating such cells is operated in synchronous with the dynamic change of state of the cells so that the illumination is extinguished (dark) as the cells approaching the relaxed state. The duration of this light-extinguishing period is a fraction of a frame time, the time for refreshing (updating data for) a full image frame. The operation time for applying the control signals for setting the cells to the relaxed state is approximately the same as that of addressing image data to a single display line. A preferred embodiment is to group the display lines in such a manner that all lines in a group are set to the relaxed state simultaneously. Accordingly, the added operation time for setting to the relaxed state is less than a small fraction of a frame time As the illumination is turned off for the cells being set to the relaxed state, the change of state of the LC cells that deviates from the image is not visible and does not produce any disturbing artifact. Accordingly, a longer time may be allowed for the cell to approach and settle to the relaxed state without introducing adverse effect to image quality.

The present invention further provides an apparatus comprising LC cells and LED elements, and an operation method thereof to set the LC cells to replicate the input image after setting the LC cells to the relaxed state. The LED light source is then turned on to provide distributed illumination as defined by the input image signal.

The present invention provides a display apparatus comprising LC cells and an operation method thereof wherein setting the LC cells is primarily in the direction toward a more charged state. Accordingly, the response time of the LC cells is improved. Furthermore, since the illumination light source is extinguished when the LC cells are set to relaxed states, the undesirable leak of light during the transition of cell switching is eliminated, thereby improving the contrast ratio and eliminating flicker.

BRIEF DESCRIPTION OF THE DRAWING

FIG. 11 is an illustration of the prior art.

FIG. 12 is a preferred embodiment of the present invention.

DETAILED DESCRIPTION OF THE INVENTION

Figure 1A:
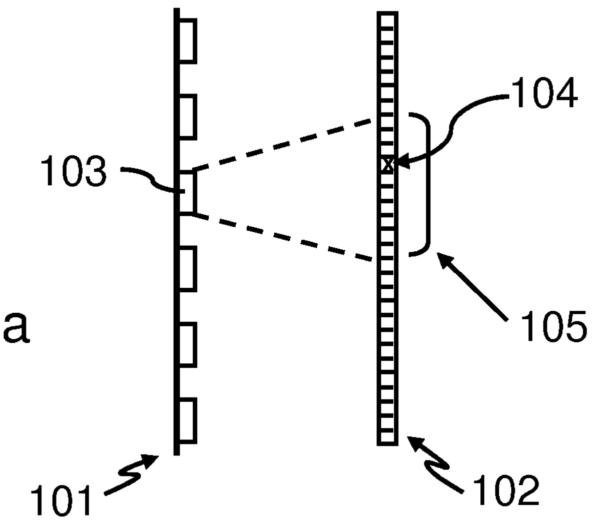
FIGS. 1*a*, 1*b*, 1*c* and 1*d* are schematic diagrams of a preferred embodiment of the present invention.

In this description, a light modulator is a device that modulates the light output from a light input, according to a control signal. A light modulator may be a single cell or comprise a plurality of cells, wherein each said cell operates to modulate the light directed thereto according to a control signal. Preferred embodiments of a light modulator include passive and active liquid crystal display array, and MEMS array. For the purpose of illustration, the liquid crystal (LC) cell and the liquid crystal display (LCD) array is used as examples of the preferred embodiment where appropriate.

A light valve is a single device that modulates the light directed thereto according to a control signal. Preferred embodiments of a light valve include passive and active liquid crystal cell, and a MEMS cell. For the purpose of illustration, the liquid crystal (LC) cell is used as the preferred embodiment of a light valve in this specification.

A control signal, typically an applied voltage, causes a light valve to change from its current state to a final state. The response time is the measure of time for the light valve to substantially complete such change of state in response to an applied voltage. For example, in a common practice, the time for completing 90 percent of the transition of such change of state is considered as the response time.

A light valve responds to a control signal by conforming to the control voltage applied to the light valve. This is typically a charging or a relaxation process. For example, in a light valve of LC cell, an applied voltage higher in magnitude than the existing voltage causes charging (energizing) to the LC cell; conversely, a lower voltage causes relaxation (discharging) of the LC cell. A charging or energizing process causes the light valve to conform to a stronger electrical field induced by the higher voltage, and a relaxation process allows the light valve to re-arrange more according to its internal forces. In a fully relaxed state where the applied voltage is zero, a light valve is aligned according to its internal structure and forces. Furthermore, the response of such light valves is typically substantially slower in relaxation than in energizing. For example, a liquid crystal (LC) cell responds to a voltage that sets the cell to a charge neutral state (relaxed state) in about 10 to 25 millisecond; same LC cell responds to a voltage that energizes (or charges) the cell in about 5 milliseconds or less.

The present invention provides an apparatus comprising a light source; a plurality of light valves modulating light output from said light source; a data electrode for applying data voltages to said light valves; a control means, such as a control circuit, performing recurring operations on said light emitting elements and said light valves; said operations comprising: 1) setting a light emitting element to off or a dimming state; 2) setting a light valve illuminated by said light emitting element to a relaxed state; wherein in an operation cycle, said operation 1) precedes or overlaps said operation 2). A dimming state of a light source corresponds to a light source setting where the light output is nearly the minimum of the dynamic range of the light output in an operation. For example, a setting to turn an LED off may set the LED to the lowest light level of its operation range where the light output is nearly extinguished. A dimming state in such example represents a setting near the lowest lighting level of the LED.

A preferred embodiment of the control means is a control circuit comprising a programmed integrated circuit (IC) or a plurality of integrated circuit elements. The program comprises executable instructions to perform the operations provided in this invention. Such control circuit is typically assembled on a printed circuit board.

A light emitting element, such as an LED is commonly driven with a current source to provide a controlled intensity. The light intensity is readily controllable according to the drive current. The drive current may be adjusted by the current level (commonly referred to as amplitude modulation in the art), or by the PWM (abbreviation for pulse width modulation in the art) method that adjusts the duty, where the duty corresponds to the fraction of time during which period the current is enabled. Therefore, in both types of drive methods, the observed light intensity generally corresponds to the time-averaged current value. A light valve such as an LC cell is commonly driven with a voltage signal. The voltage signal may be supplied by a data driver that provides data voltage signals at its output terminals according to input image signal.

The present invention further provides a drive method to operate a display apparatus comprising a light source and a plurality of light valves modulating the light directed from said light source in a manner that before addressing or refreshing the light valves with new image data, the light source is set to a dimming state and the light valves are set to a discharged state. The present invention further provides a circuit in functional definition to perform said operation above.

A light valve operates to control the amount of light delivered from the source to the viewer. In the example of a liquid crystal (LC) light valve in an active matrix liquid crystal display (LCD), a control voltage is applied to two electrodes of an LC cell, wherein one electrode is a common electrode and the other is connected to a data electrode via a thin-film transistor (TFT), where the TFT is controlled by the scan electrode and the scan driver connected thereto. A light source (backlight) is arranged on the backside of the LC cell, and the LC cell is controlled by an applied voltage to modulate the light transmission from the back to the front (the viewing side).

Accordingly, in operating a liquid crystal (LC) cell, a voltage is applied to the LC cell, thereby setting the LC cell to a state between the fully relaxed state and the fully charged state according to the applied voltage. A higher applied voltage in magnitude causes a higher electrical field and greater degree of preferential alignment of the LC along the electrical field. The amount of light delivered through an LC cell is affected by the degree of preferential alignment of the LC cell, and by the orientation of the optical components such as polarizer.

A preferred embodiment of the LCD display is structured so that the relaxed state of the LCD cells corresponds to a bright state. In a relaxed state, the electrical field between the two electrodes is nearly zero, and the LC is aligned to the surfaces according to the molecular forces and the surface structures. A preferred embodiment is structured so that the directions of LC alignment at the light entering surface (i.e., the back side of the LC cell) and at the light exiting surface (the front side of the LC cell) are different by an angle; the orientations of the polarizer at the entering surface and the orientation of the polarizer at the existing surface are different by a similar angle. Accordingly, the highest amount of light passes from the back side to the viewing side when LC is in the relaxed state. Furthermore, the transition of the LC material from a relaxed state to a charged (i.e., energized) state is substantially faster than the transition in the opposite direction. In such typical embodiment, a relaxed state of LC cell corresponds to the bright state. The description herein illustrates the present invention using such embodiment.

A preferred embodiment of the present invention uses a light source that switches in a fractional time of that of switching the LC cells. An example of such preferred embodiment is using LED as the light source and LCD cells as the light valves. The LED response time (T2) is in the order of 200 micro seconds, and the typical LC response time (T1) is a few milliseconds. For the LC response time, the relaxation time (Tr), i.e. going from a charged state to the relaxed state, is typically longer than the charging time Tc (i.e., the response time from a relaxed LC state to aligning the LC structure to an applied electrical field.)

In this description, the recurring operations may comprise similar operations performed at equal time intervals (i.e., cyclically), as well as at varying time intervals.

Preferred embodiments of the present invention are herein described using light emitting diodes (LED) as light source, and liquid crystal display (LCD) cells as light modulator for illustration. Examples of constructing a display apparatus comprising array of LCD cells and LED light source are found in U.S. Pat. No. 5,408,109, and examples of using organic light emitting diode to form active matrix display devices are found in U.S. Pat. No. 5,684,365 and U.S. Pat. No. 6,157,356, all of which are hereby incorporated by reference for the purposes of background and illustration.

FIG. 1*a* provides a schematic drawing of the side view construction of a preferred embodiment of the LEDs and LCD array in the apparatus of the present invention, wherein 101 is an assembly of the LED light source, 103 is an LED lighting element, 102 is an array of LCD cells, and 105 represents an area of LCD cells illuminated by LED lighting element 103, wherein 104 represents a single LCD cells within the area 105. In the 2-dimensional array view, 103 expands to a group or a row of LED elements, and 104 expands to a group (row) of LCD cells controlled by the a scan terminal. The 3-dimensional illustration is provided in FIG. 1*c* where 120 is the LCD array, and 121 Is the LED light source illuminating the LCD array. The arrangement of the light source may be a single lighting element, a planner light source, one or more lighting tubes, or an array of lighting elements such as LEDs shown in the figure.

Figure 1B:
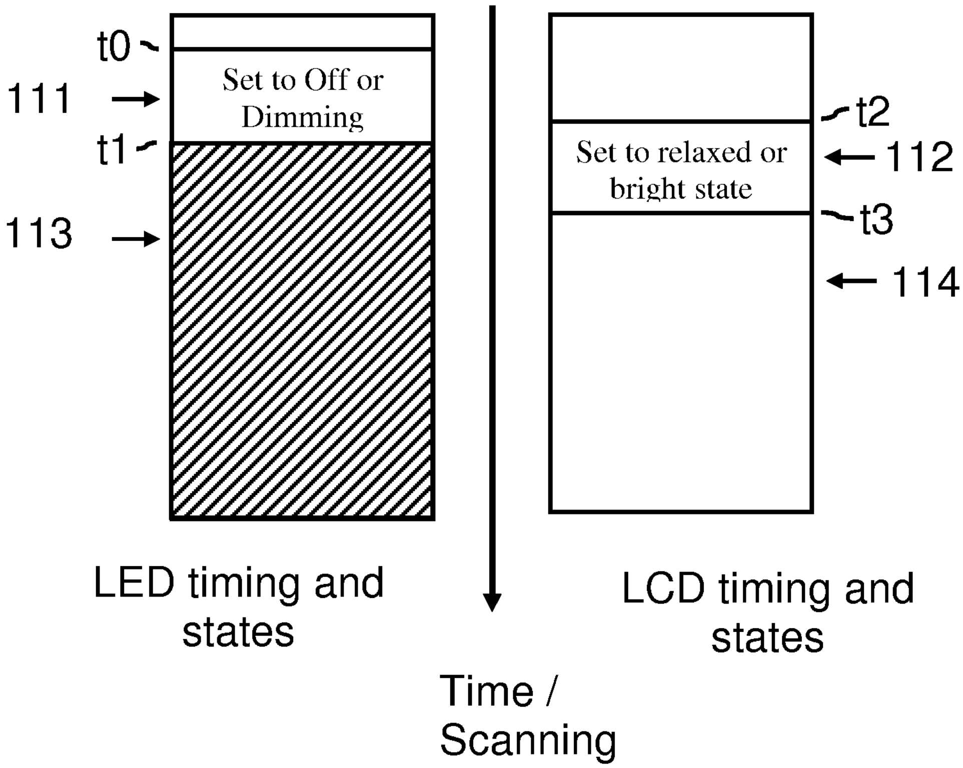
Figure 1C:
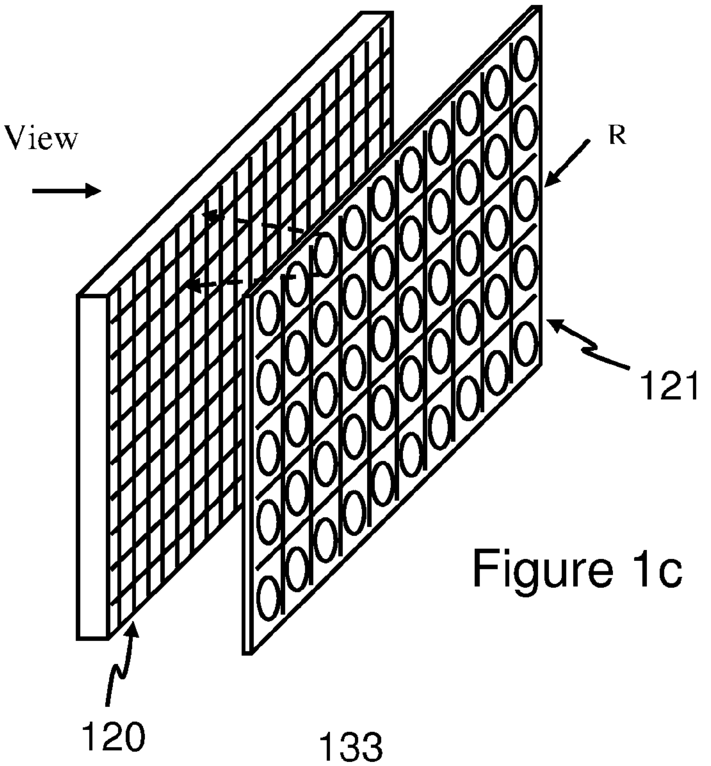
Figure 1D:
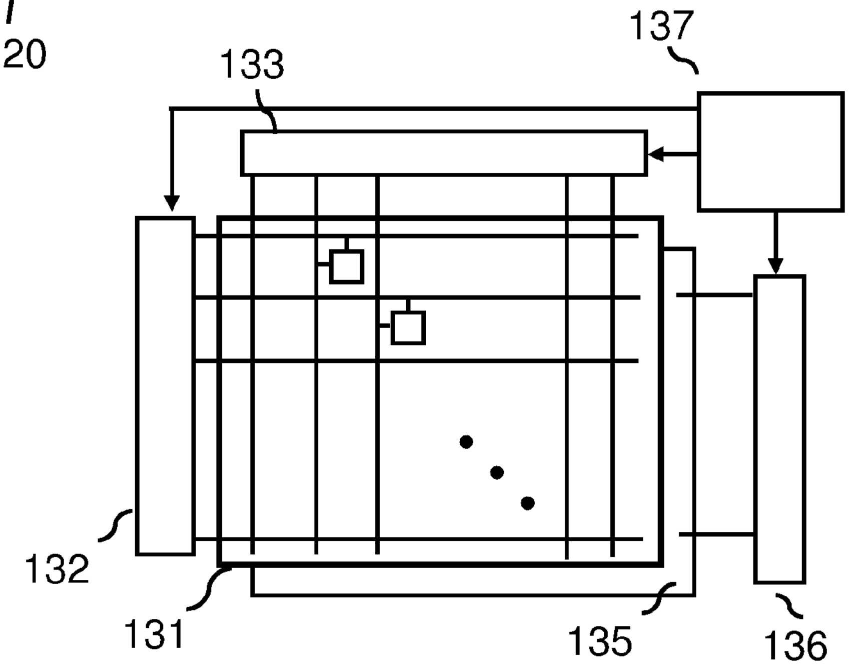

FIG. 1*d* provides a schematic drawing of the circuit diagram of a preferred embodiment of present invention, wherein the scan driver circuits 132 provides multiple scanning signals for the selection of cells in the LCD array 131 to receive data, the data driver 133 delivers image data to LCD array 131, LED driver circuit 136 provides drive current to the LED light source 135, and the control circuit 137 operates to process image data and provide synchronized control signals to the LCD and LED drivers. In one preferred embodiment, the LED driver 136 is constructed to have drivers distributed in the LED array wherein each driver output control an LED or a set of LED in series. Register or memory may also be integrated in the driver to maintain a drive current for a prolonged period of time. In another preferred embodiment, the LED driver 136 is constructed in rows and columns, to address the LED array with drive signals, wherein, each element of LED array is connected to a local driver circuit that responds to the drive signal and sets the LED driver current. In response to the control signals generated by the controller 137, the LED driver 136 increases or decrease drive current to the LED, thereby increasing or decreasing the light output of the LED lighting elements. In response to the controller signals for the LCD array, the LCD driver 132 selects the LCD cells to receive the data input, thereby increasing or decreasing the light transmission of the selected LCD cells according to the data signals.

A preferred scan driver 132 comprises a plurality of outputs. The cells of LCD array 131 are arranged in scan groups wherein all cells in one scan group are connected to the same output terminal of the scan driver 132, and are selected simultaneously to receive the data. A preferred scan group is a row of cells in the array. Without limiting the generality of a scan group, in the following description, a row indicates a scan group that is connected to the full set of data driver outputs. Therefore, different rows of cells must be selected at different time for receiving different image data of their own. For this reason, a scan (or row) driver used in a conventional LCD display operates to select one scan group (or one row) at a time, and operates sequentially.

In another embodiment, the driver circuit 132 further incorporates a function that operates to select a plurality of rows of the LCD cell array simultaneously by a control signal. The driver circuit 132 in another embodiment of the present invention further incorporates a function that operates to select all rows of the LCD cell array simultaneously. In yet another preferred embodiment of the present invention, the scan driver incorporates a function to set all the selected rows of cells simultaneously to a state that corresponds to a relaxed state of the LC cell. The driver circuit 132 may be a single integrate circuit (IC) that has sufficient output terminals to connect to and control the LCD rows as described, or an assembly of multiple driver ICs each one having the full function as described above and operating on the LCD lines connected to its output terminals independently according to its control signal.

In the present invention, the control circuit 137 provides a synchronized timing control to drive the LED 135 and LCD 131. FIG. 1*b* provides a timing diagram of a preferred embodiment of the synchronized drive of LED and LCD. The time axis indicates the direction of the time. The LED timing and states on the left of the time axis gives the control circuit timing for LED drive and the state of LED 103 in response to the control voltage. The LCD timing and states on the right of the timing axis gives the control circuit timing of LCD drive voltage and the response of the LCD cells in area 105 illuminated by LED 103. The control circuit applies a signal at t0 to set LED to off or a dimming state. Such applied signal may be a short pulse or remains the same for a prolonged period. In a preferred embodiment, a short purse is applied in the period 111 between t0 and t1. Accordingly, the LED driver that sets the drive current of LED 103 to is set to zero or low current which corresponds to an off or a dimming state of LED. A preferred embodiment of the LED driver comprises an internal memory so that the LED remains in the off or dimming state in region 113 after t1 until the next LED setting signal arrives. In the time period 112 between t2 and t3, the control circuit and the LC driver circuits applies a voltage to LC cells that sets the LC drive voltage to low or zero which corresponds to a discharged or relaxed LC state. The LC cell responds to the voltage with relaxation in subsequent time. A preferred method for setting the area 105 LC cells to the relaxed voltage is to activate all the scan outputs that select the lines corresponding to area 105, and simultaneously provide data voltage that sets LC cell voltage to zero. Another preferred method of setting the group 105 cells to relaxed state is to reverse the scan driver output voltage on the lines corresponding to area 105 so that the LC cells in said area are set to a voltage outside the dynamic range, and simultaneously set the voltage on the counter electrode of the LC cells similarly to neutralize the LC cell voltage. In the subsequent time period 114, the LC approaches a relaxed state in response to the setting voltage.

In a preferred embodiment, the control circuit operates to set the LED drive current by sending a select signal to select the driver of LED 103 and simultaneously sending the LED data which set the LED driver output to low current. The control circuit operates to set the drive voltage of LCD cells in area 105, which includes LCD cell 104, by sending a select signal that selects the LCD cells in area 105 to receive image data and simultaneously address the LCD cells with the data signal that corresponds to the discharge or relaxed LC state. In this embodiment, all cells in the group in area 105 are turned to a discharged state in one selection. In a preferred timing sequence, time t2 is later than t1, or between t0 and t1 but near the end of t0-t1 period. For displaying dynamic images where the image data changes with time, the method of operation of setting LED and setting LCD described here repeats; such operation precedes the data addressing period during which the new image data is written to the LC cells in an image refreshing cycle.

In another preferred embodiment, a device comprising a control means performing recurring operations of:

1) applying a control signal that decreases a current source, or sets a current source to off;

2) applying a control signal that sets a plurality of voltage sources to zero or near zero;

wherein said current source supplies current to a light emitting element, and wherein said voltage sources supply voltage signals to a plurality of light valves;

wherein said control means operates to maintain coordination between the two operations according to a timing sequence;

In a preferred embodiment, the above said timing sequence operates said two operations within 30 milliseconds in one recurring cycle.

As described in paragraph 45, the decreasing current in the light emitting element gives decreasing (lower) light intensity of the light emitting element.

Since the response time of LC is substantially longer than that of LED, the decrease of LED light output in response to the setting is substantially faster than the response of LC cells to reach the relaxed state. The LED elements will reach an off or a dimming state before the LCD cells change substantially, even the signal of setting LC cell is applied prior to applying the setting signal of LED by s small faction of the LC response time during which time the LC cell has not changed substantially. Therefore, the operation of setting LED to off or a dimming state may be performed even after the operation of setting the LC cells to relaxed state. Thus in another preferred embodiment, the setting of LED element to off or a dimming state overlaps the operation of setting the LC cells to the relaxed state. Therefore the operation of setting LED may precede or overlap the operation of setting the LC cells to the relaxed state. Therefore, as a preferred timing, time t2 in FIG. 1*b* may be substantially close to t0, or slightly before t0.

According to the description herein above, a preferred embodiment of the present invention therefore provides an image display apparatus comprising a light source that comprises a plurality of light emitting elements; a plurality of liquid crystal (LC) cells modulating light output from said plurality of light emitting elements; a data electrode for applying data voltages to said LC cells; a control circuit performing recurring operations on said light emitting elements and said LC cells; said operations comprising: 1) applying a control signal for setting a subset of light emitting elements to off or a dimming state; 2) applying a control signal for setting an LC cell illuminated by said subset of light emitting elements to a relaxed state; wherein in an image refreshing operation cycle, said off or dimming state occurs before said light valve substantially changes its optical state in response to operation 2), and wherein said subset comprises one or more of said light emitting elements.

The light valve has a response time T1 which is the time needed for the light valve to change substantially to conform to the applied voltage. Accordingly, in a small fraction of T1, the light valve has not changed its optical state substantially. Accordingly, an alternative preferred embodiment operates according to the sequences of:

(a) said operation 2) precedes said operation 1) by a small fraction of T1; or (b) said action 1) precedes said action 2); or (c) said action 1) overlaps action 2).

Here the response time T1 corresponds to the action of the LC cell; it is the relaxation time when the action is setting the LC cell to the relaxed state, and is the charging time when the action is to apply an electrical field from an relaxed state.

After setting the LED 103 to off or a dimming state and setting LC cells in 105 illuminated by LED 103 to the discharged or relaxed state, the LC cells in region 105 remain in the relaxed state for a period that is a fraction of the period of one refreshing cycle.

Figure 2A:
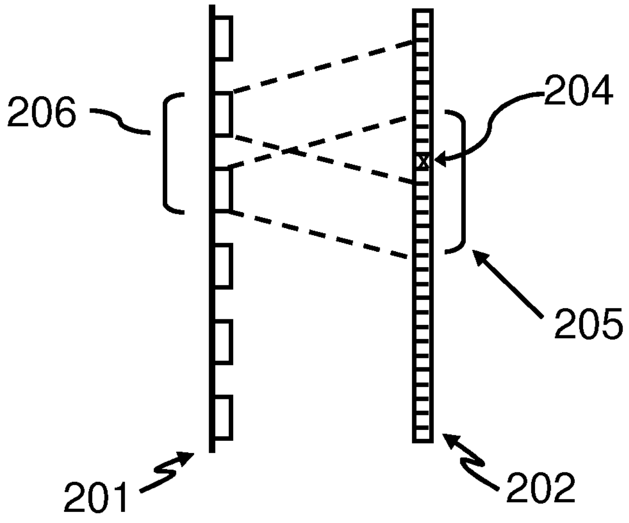
FIGS. 2*a* and 2*b* are schematic diagrams of a preferred embodiment of the present invention.
Figure 2B:
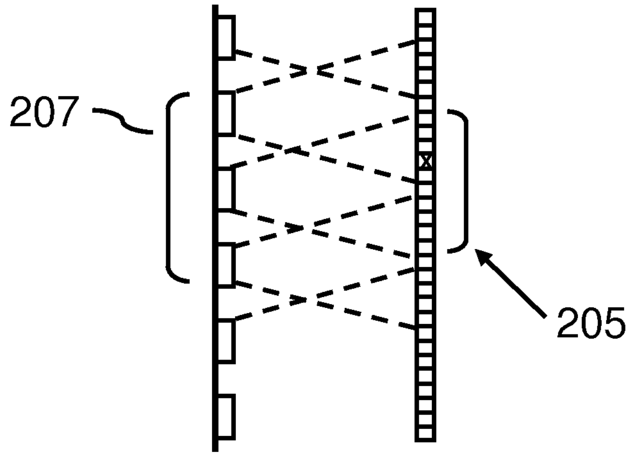

An LC cell in region 205 is illuminated by LED elements from more than one group of LED, as illustrated in FIG. 2*a*, where LC cell 204 is illuminated by multiple elements in LED group 206. In a preferred embodiment, setting a LC cell 204 in area 205 to the relaxed state is preceded by setting all the LED elements that illuminate on LC 204, i.e. all LED elements in area 206, to off or a dimming state. Furthermore, in another preferred embodiment, setting a group of LC cells to the relaxed state, all LED lighting elements illuminating on any cells in the group are set to off or a dimming state. As illustrated in FIG. 2*b*, area 207 comprising the LED lighting elements that illuminate on LC cells in area 205. In this preferred embodiment, setting section 205 LC cells to the relaxed state is preceded by setting all LED elements in area 207 to off or dimming state.

Figure 3A:
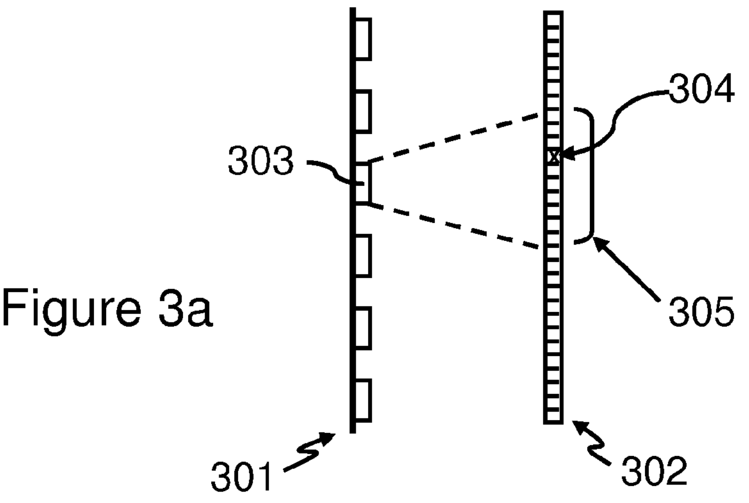
FIGS. 3*a* and 3*b* are schematic diagrams of a preferred embodiment of the present invention.
Figure 3B:
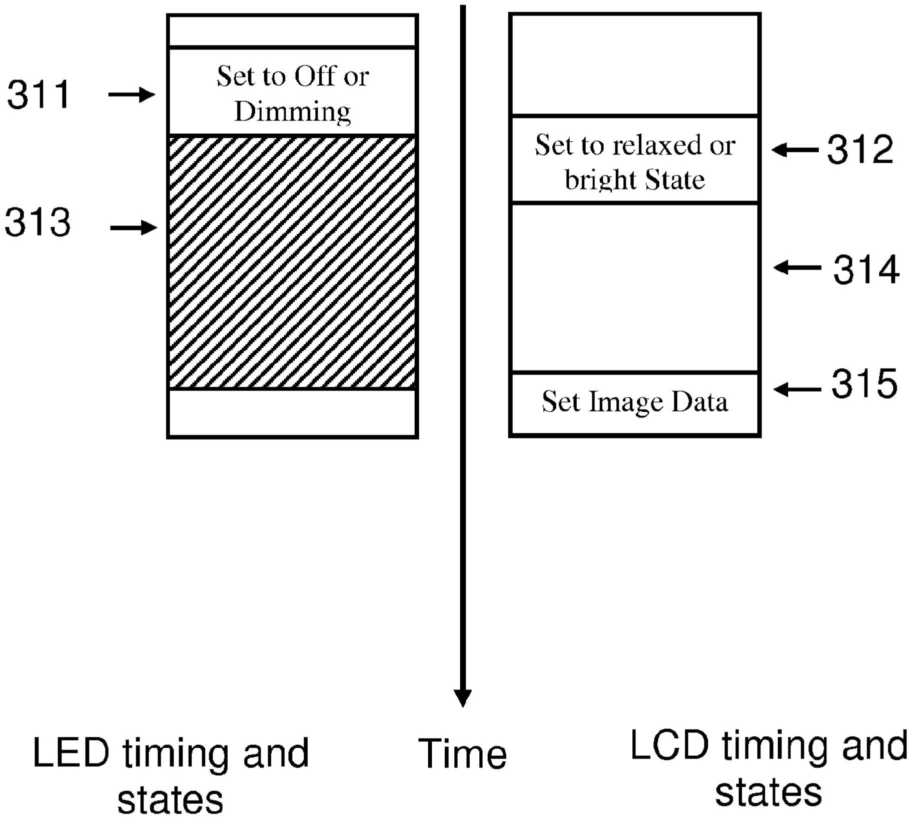

FIG. 3 provides another preferred embodiment wherein, in the period 311 the control circuit delivers a control signal to the LED driver that sets the drive current of LED 303 to low which corresponds to an off or a dimming state of LED; in the time period 312, the control circuit and the LC driver circuits set the LC drive voltage to low or zero which corresponds to a discharged or relaxed LC state; and in the subsequent time period 314, the LC approaches a relaxed state in response to the setting voltage. The LED elements 303 remain in the off or a dimming state after the setting period 311 for a controlled period of time 313, typically a fraction of the refreshing cycle. A preferred method for setting the LC cells in area 305 to the relaxed voltage is to activate all the scan outputs that select the line corresponding to area 305, and simultaneously provide data voltage that sets LC cell voltage to zero.

In a preferred embodiment, the period 314 is long enough for the LC to settle to a state in the proximity of the full relaxation. With such embodiment, the period 314 may be set the same for all the LC cells to complete the transitions to the proximity of the fully relaxation. In another preferred embodiment, the period 314 is substantially shorter, but long enough for the LC in the area being operated to reach a relaxed state that is more relaxed than the next LC state that corresponds to the image being addressed. For example, if the fully relaxed state corresponds to a gray level of 255, and the new image data requires the LC to be set at level 200 which is less relaxed (or more charged) than the full relaxation (255), period 314 may extend long enough for the LC to a transition to pass level 200. Since each area may comprise different image data and thus different LC states, the period 314 may be set to different duration for different areas and different image data.

In a preferred embodiment, following period 314, the control circuit delivers the scan signal to the scan driver and image data to the data driver in period 315, sequentially selecting the rows of cells in area 305, and addressing the corresponding image data for the cells selected. Therefore, in this preferred embodiment, the present invention comprises a third operation 3) setting said LC cell to a state according to input image data to produce image; wherein in an image refreshing operation cycle, operation 2) precedes operation 3).

Figure 4A:
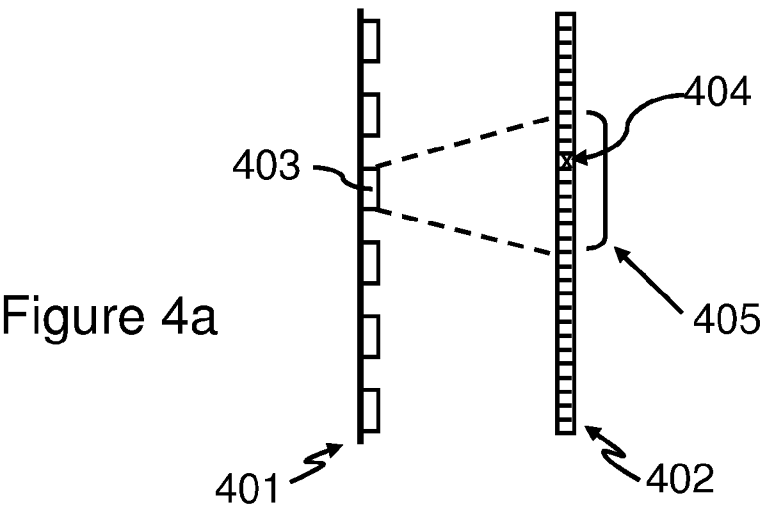
FIGS. 4*a* and 4*b* are schematic diagrams of a preferred embodiment of the present invention.
Figure 4B:
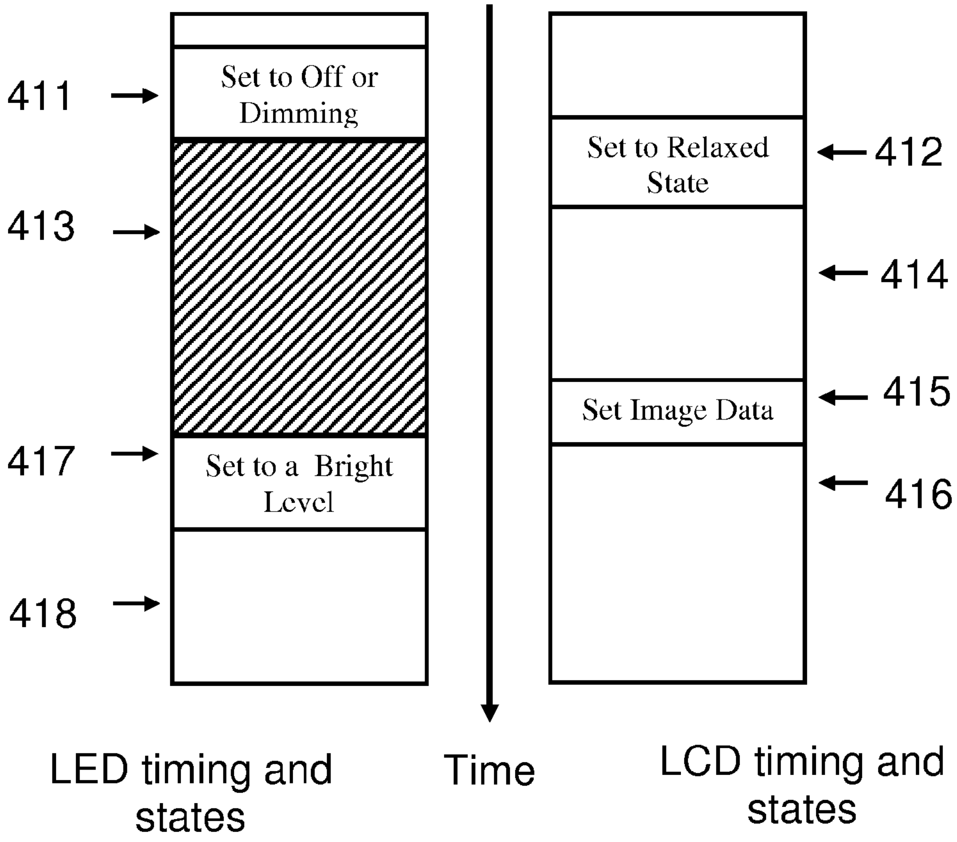

FIG. 4 provides another preferred embodiment wherein the control circuit operations comprise the operations of FIG. 3; wherein, in the period 411 the control circuit delivers a control signal to the LED driver that sets the drive current of LED 403 to low which corresponds to an off or a dimming state of LED. The LED element 403 remains in the off or a dimming state in the subsequent period 413. In the time period 412, the control circuit and the LC driver circuits set the LC drive voltage to low or zero which corresponds to a discharged or relaxed LC state for 404; and in the subsequent time period 414, the LC approaches a relaxed state in response to the setting voltage. Subsequent to 414, the control circuit delivers the scan signal to the scan driver and image data to the data driver in period 415, sequentially selecting the rows of cells in area 405, and addressing the corresponding image data for the cells selected.

Subsequent to period 413, the control circuit further performs an operation in the time period 417 to set said light emitting element that has been set to off or a dimming state in said operation 1) to a bright state. Since the response of the LC is slower than the response of LED, in a preferred embodiment, the setting of the LED elements to the bright state is performed either after or overlaps the setting of LCD cells in an operation cycle. Wherein the LED elements remains in the bright state for the period of section 418, and wherein the LCD cells approach their respective state representing respective image point in the period 416 after the setting period 415.

Therefore, a preferred embodiment of the present invention includes a display apparatus described in FIG. 3 above, further comprising a forth operation: 4) setting said light emitting element that has been set to off or a dimming state in the prior operation 1) to a bright state; wherein in an operation cycle, operation 3) precedes or overlaps 4).

In another preferred embodiment of the present invention, the operation 4) above sets the light emitting element that has been set to off or dimming state in said operation 1) to a brightness level according to a scaling relation. In a preferred embodiment, such scaling relation directs to a brightness level setting that, in at least part of the gray scale range of the image, increases or decreases according to the average brightness in an area surrounding said light valve illuminated by said light emitting element. Accordingly, the brightness level setting increases with increasing average brightness in an area surrounding said light valve. For example, the gray scale range from full dark to full bright is represented by 0 to 255. The scaling relation above directs to a brightness level setting that increases with increasing average brightness of the image in said area in the range from gray level 100 to 200. In another preferred embodiment, such scaling relation relates to the maximum brightness in said area instead of the average brightness. In another preferred embodiment, operation 3) precedes operation 4).

Figure 5A:
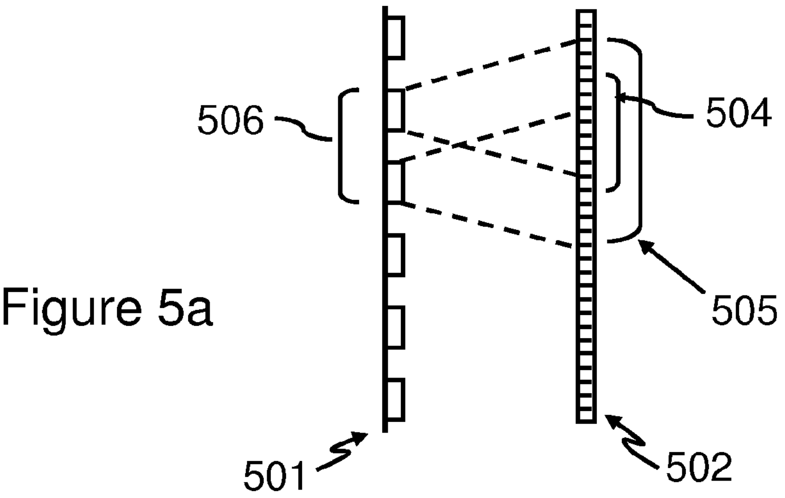
FIGS. 5*a* and 5*b* are schematic diagrams of a preferred embodiment of the present invention.
Figure 5B:
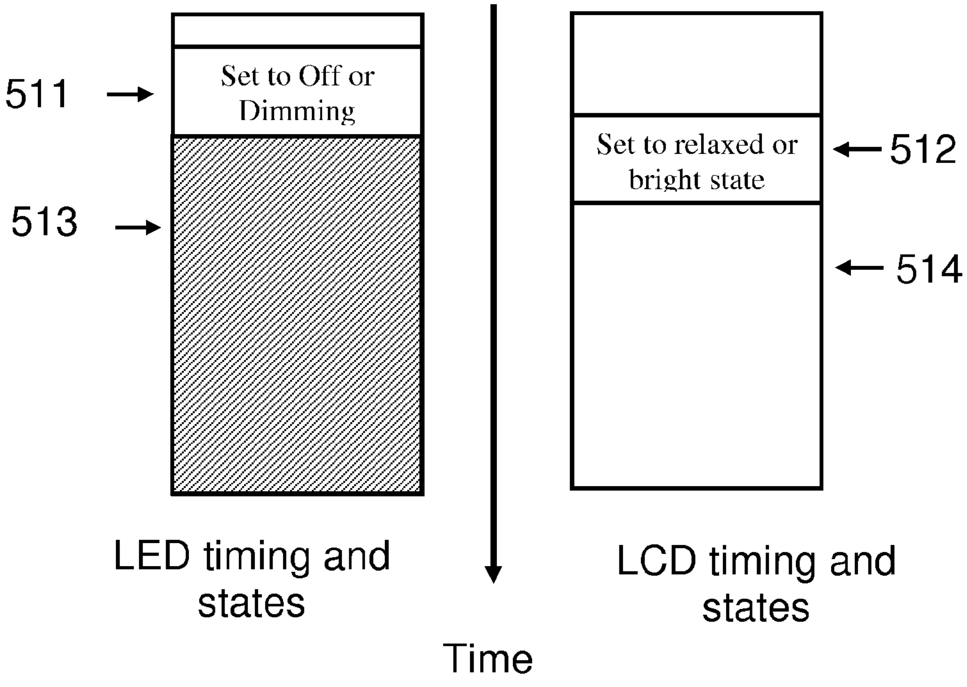

FIG. 5 illustrates further detail for a preferred embodiment wherein more than one LED light element illuminate one group of cells setting to the relaxed state, and an LC cell is illuminated by more than one LED source that turn on and off at different times. Area LC cells in area 505 are illuminated by the LED elements in area 506. In the area 504, the LC cells are illuminated by both elements in area 506. After completion of addressing image data to the trailing edge of area 504, the first LED element in area 506 is turned on. At this time, only partial illumination to the cells in area 504 is provided since second (lower) LED element in area 506 remains off. To compensate the partial illumination for part of the time, the intensity of the light is adjusted to offset the reduction in light due to the partial illumination. The adjustment is to increase the intensity by an amount equivalent to the loss of light during the time the second LED element remains off.

Figure 6A:
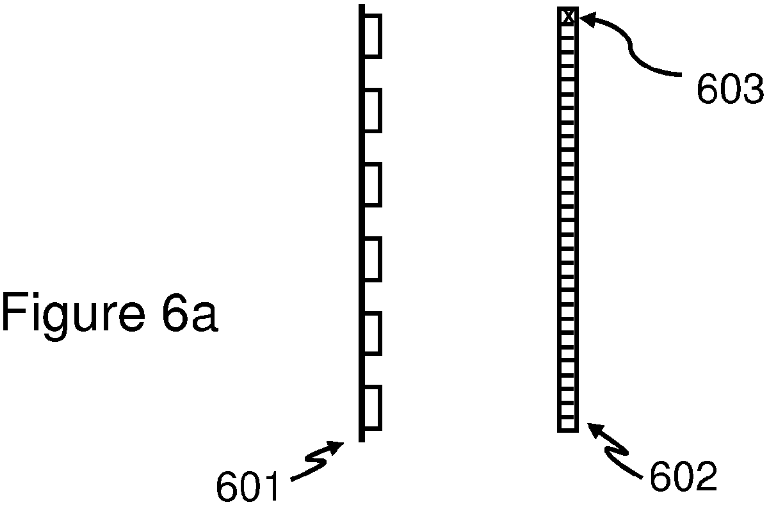
FIGS. 6*a* and 6*b* are schematic diagrams of a preferred embodiment of the present invention.
Figure 6B:
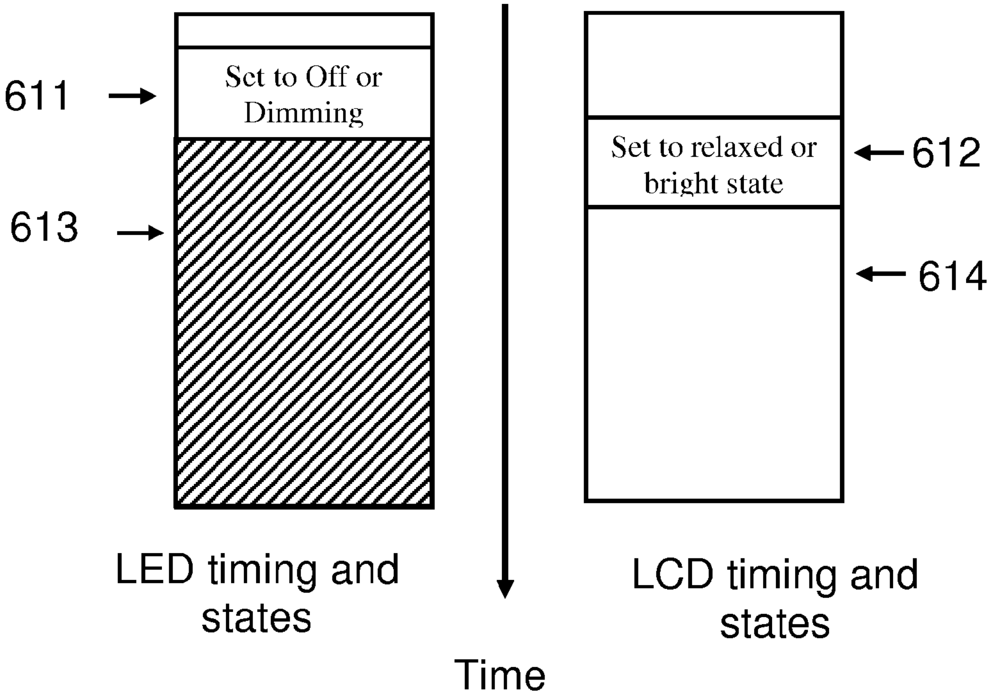

Another preferred operation (FIG. 6) of the present invention comprises a control circuit and a drive method in which the all the LED light elements are turned off, and then the LC cells are set to the relaxed state. The image data are then addressed to the LC cells sequentially. As the image data addressing proceeds, the LED elements are turned on sequentially for each section of the LC cells where the image data addressing is complete.

Figure 7:
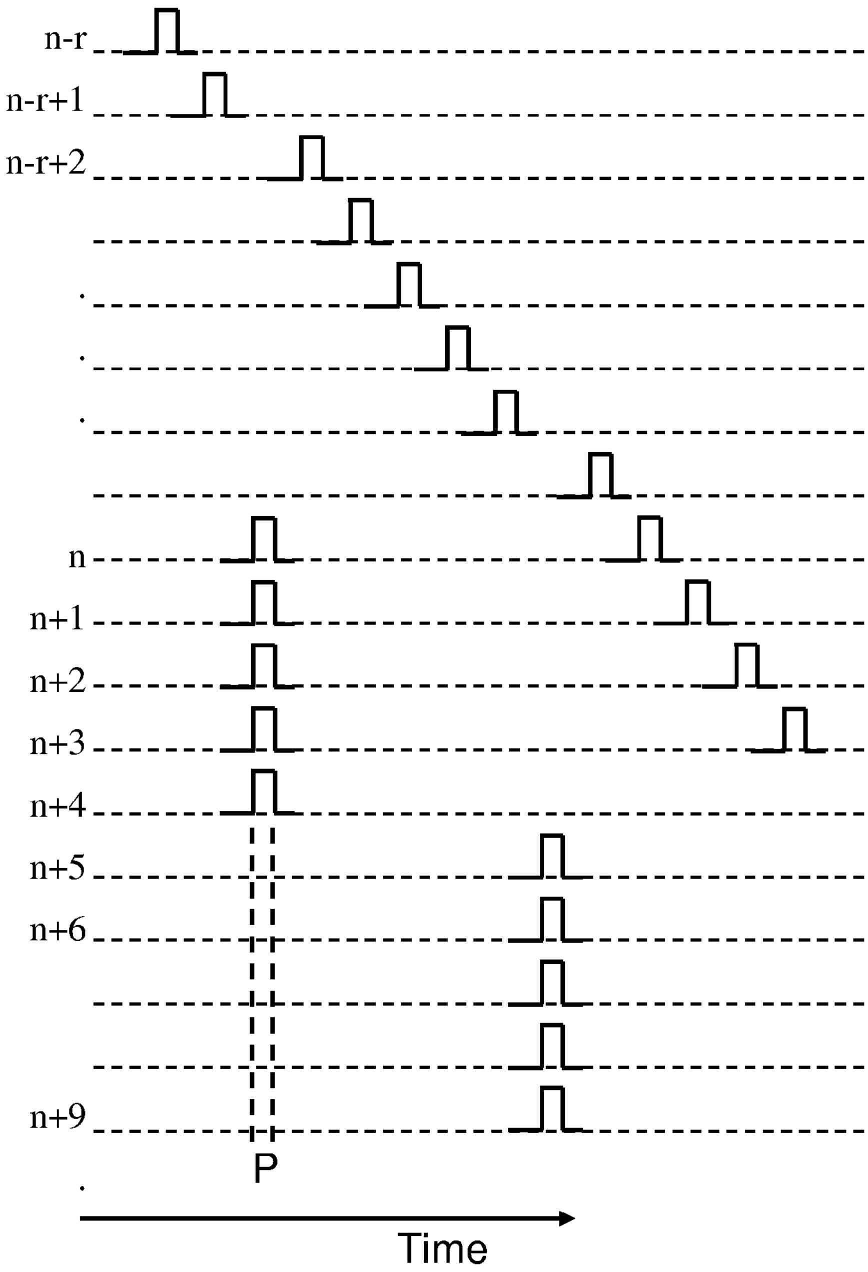
FIG. 7 is a schematic diagram of a preferred embodiment of the present invention, showing an example of timing diagram of the row driver.

FIG. 7 illustrates an example of the preferred operation of the display apparatus of the present invention, wherein n-r, n-r+1, . . . n, n+1, . . . are the indices of LCD scan electrodes of the display apparatus. Each scan electrode select a group of LC cells when its voltage is set to the select voltage. As an illustration without losing generality, the select voltage here is defined as voltage high, and the group of LC cells represents a line of LCD. The vertical axis represents the scan voltage for each of the scan electrodes. A line is selected when the scan voltage is set to a selection voltage (high) for that line. In one part of the operation to address the image data to the display LC cells, the lines are selected (scanned) sequentially, one at a time, to receive the data delivered from the data drivers. Therefore, FIG. 7 illustrates a selection sequence for receiving image data sequentially in the order of n-r, n-r+1, and then n-r+2, . . . . However, in the time period P after the addressing of line n-r+1 and before addressing the line n-r+2, FIG. 7 illustrates a preferred operation of this invention in that all lines from n to n+4 are selected as the scan voltage of all these lines are set to high during that time. Such selection of the group of lines is provided for setting all the corresponding LC cells in this group of lines to a relaxed state. The normal scan of image data resumes to n-r+2 after setting lines n to n+4. Such operation repeats to the next group as the data addressing and LC operation continue.

Figure 8:
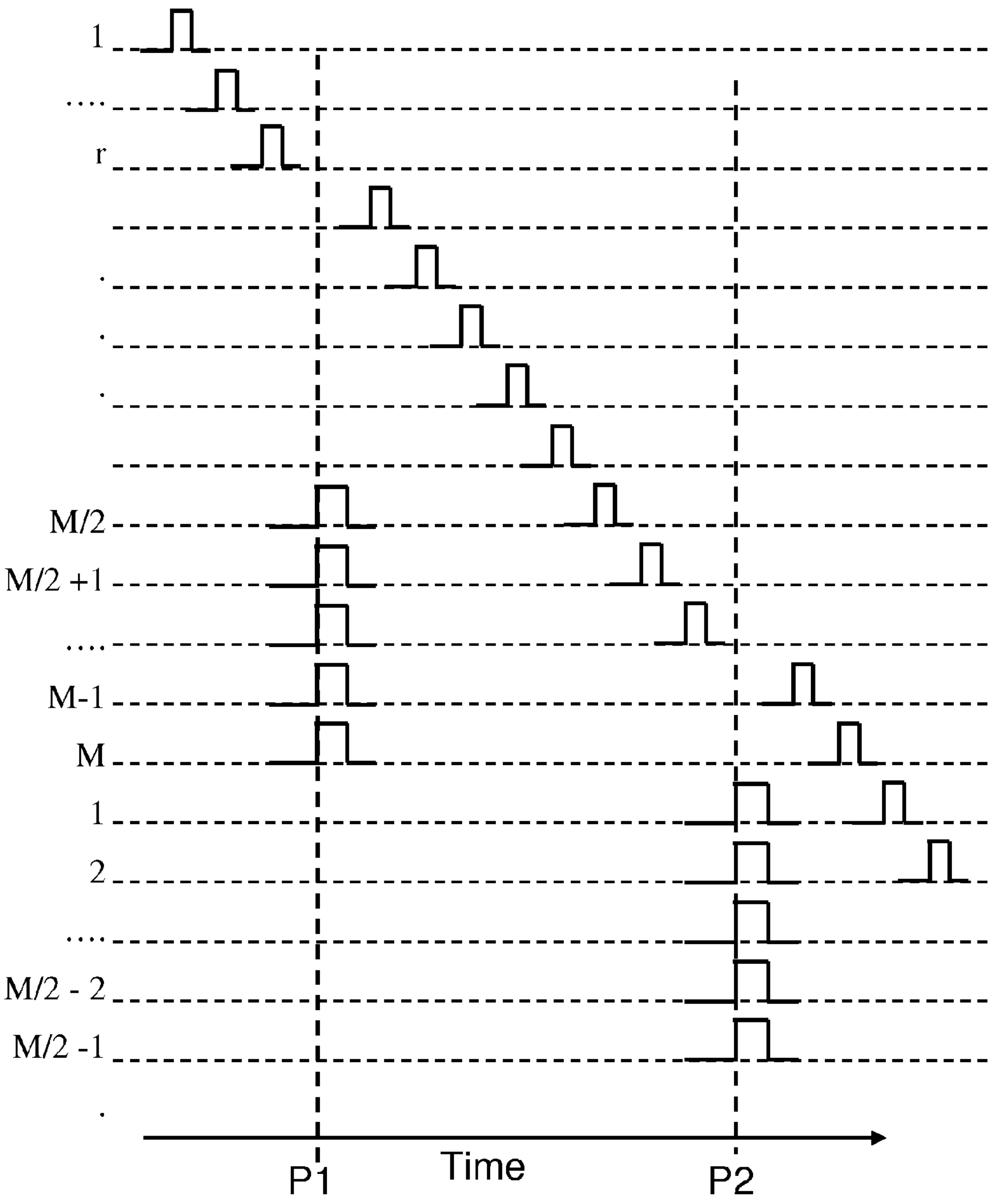
FIG. 8 is a schematic diagram of a preferred embodiment of the present invention with presetting pulses every half frame.

FIG. 8 illustrates a special example of a preferred operation of the present invention. In this example, all LC lines M/2 to M is selected in one scan pulse period (at P1) to be set to the relaxed state, and all lines from 1 to (M/2−1) are selected and set to the relaxed state in another scan pulse period (the pulse at P2). Accordingly, this example illustrates an operation that sets one half of the LC display screen to the relaxed state at a time, and sets the other half in another scan pulse period.

Figure 9:
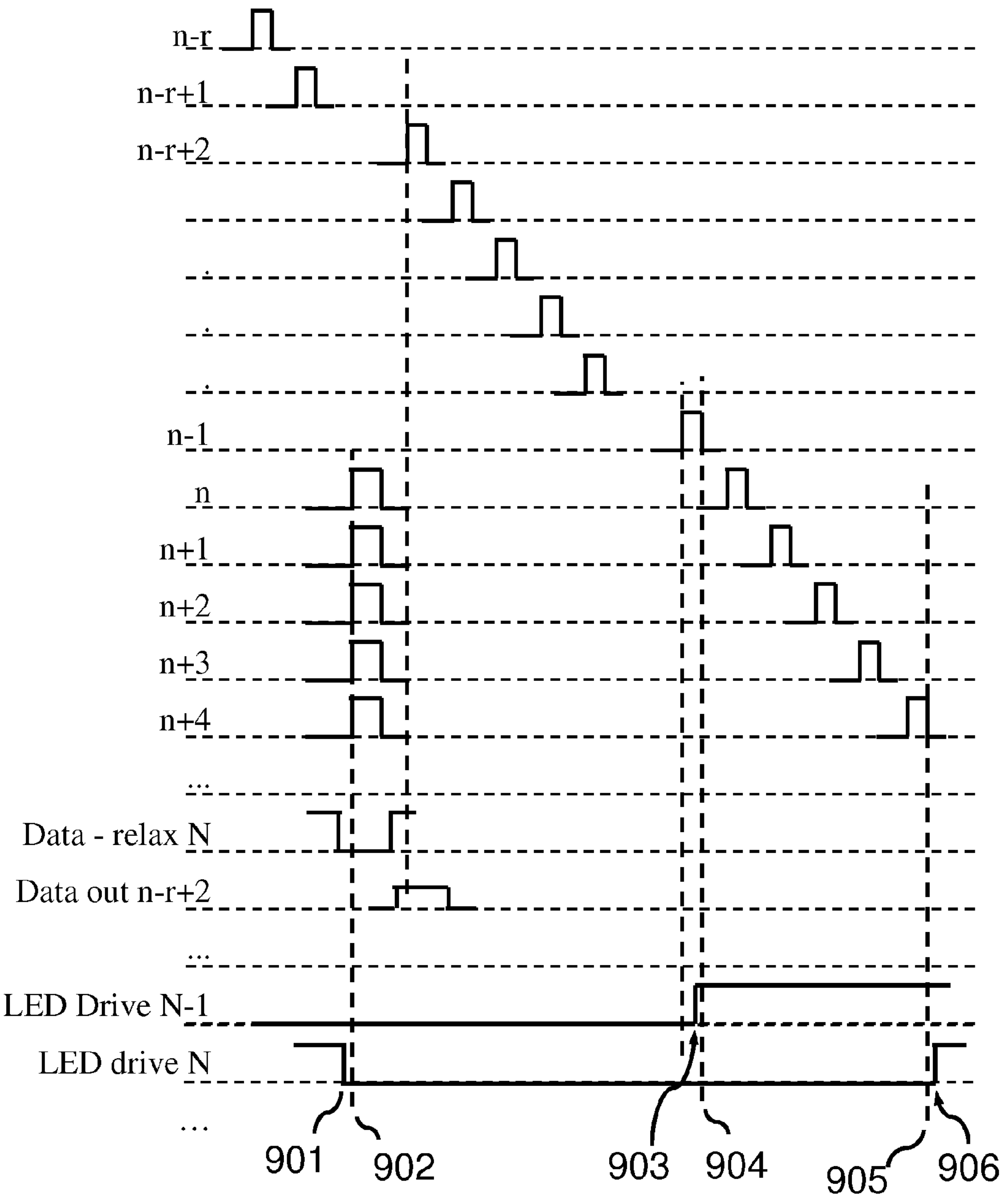
FIG. 9 is a schematic diagram of a preferred embodiment of the present invention.

FIG. 9 illustrates further detail of a preferred operation of the present invention, wherein the data signals and LED drive signals are illustrated in the same timing diagram. Here, as an example of a preferred embodiment, LED element N−1 illuminates the LC lines preceding and up to n−1, and LED element N illuminates LC cells in the group of lines from n to n+4. LED element N−1 is set to off or a dimming state earlier for setting the LC cells of the previous group (up to line n−1) to the relaxed state. Here, at the time 901 just prior to setting the LC cells in the group of lines n to n+4, LED element N is set to off, thereby turning the light sources illuminating LC lines n to n+4. The LC cells in line n to n+4 are then selected at time 902 and set to the relaxed state therein. During the pulse period of selecting lines n to n+4 at 902, the data signals from date drivers are set to the relaxed voltage (Data-relax N) to discharge the LC cells being selected. After this setting period, the next scan signal is a single pulse selection to select line n-r+2, and the data signals from the data driver resume to the normal image data (Data out n-r+2) for displaying image. As the image data addressing proceeds and completes for the preceding section (up to line n−1) at the time 904, LED element N−1 is turned on at the time 903 and the image in the preceding group is visible. Subsequently, as the image addressing proceeds further and completes for the section of lines n to n+4 in this group at the time 905, the LED element N is turned on at the time 906 and the image in the this section is visible.

Figure 9A:
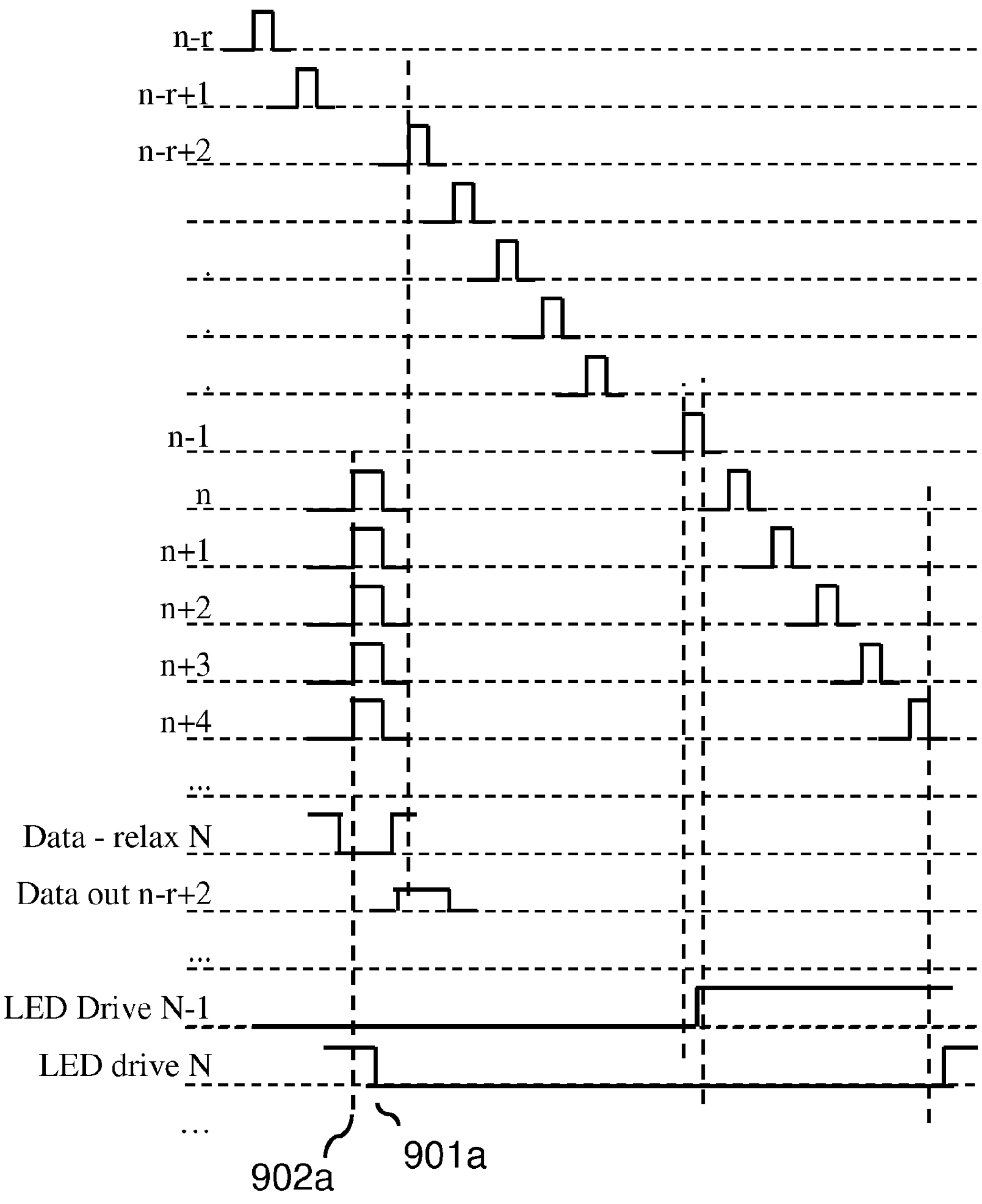
FIG. 9*a* is a schematic diagram of a preferred embodiment of the present invention.

FIG. 9*a* illustrates further detail of another preferred operation of the present invention, wherein the operation is otherwise similar to that of the diagram in FIG. 9, the operation sets the LED element N to off state at the time 901*a* after setting the LC cells in the lines n to n+4 illuminated by LED element N to relaxed state at the time 902*a*. Since the LC's relaxation is slower than the LED's response, the states of the LC cells are not changed substantially until the time 901*a*.

Figure 9B:
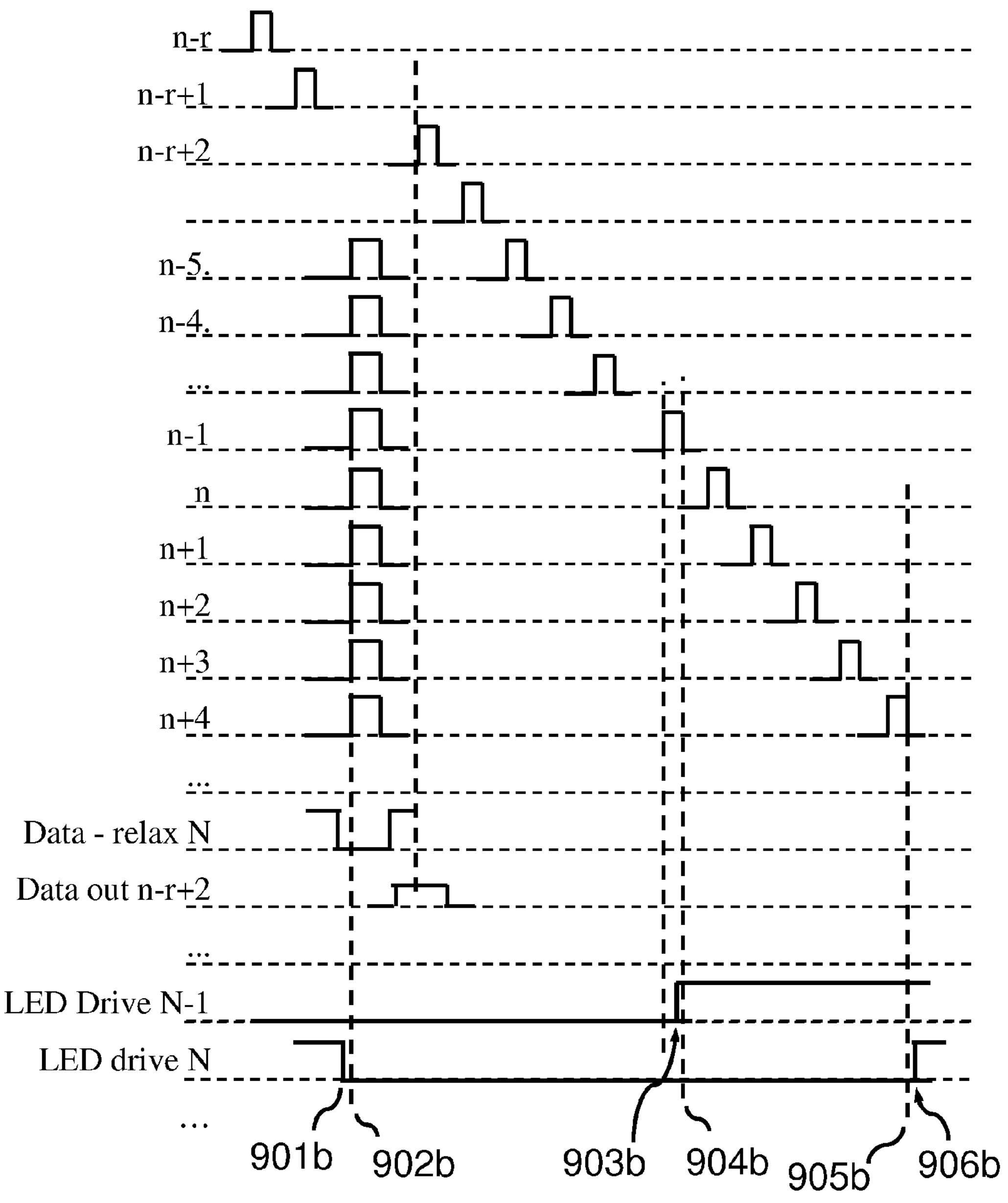
FIG. 9*b* is a schematic diagram of a preferred embodiment of the present invention.

FIG. 9*b* illustrates further detail of a preferred operation of the present invention, wherein the data signals and LED drive signals are illustrated in the same timing diagram, and wherein a group of the LC cells are illuminated by more than one LED element. Here, as an example of a preferred embodiment, LC cells in the group of lines n−5 to n+4 are illuminated by LED elements N−1 and N; wherein LED element N−1 illuminates the leading section of the lines in this group and LED element N illuminates the trailing section of lines in this group. There two LED elements overlap and there are LC cells illuminated by both. Since the LED element N−1 also overlaps with its preceding LED element N−2, LED element N−1 is set to off or a dimming state earlier for setting the LC cells of the previous group to the relaxed state. Here, at the time 901*b* just prior to setting the LC cells in line n−5 to n+4 to the relaxed state, LED element N is set to off, thereby turning all the light sources illuminating LC lines n−5 to n+4 (i.e., both LED elements N−1 and N) off. The LC cells in line n−5 to n+4 are then selected at time 902*b* and set to the relaxed state therein. During the pulse period of selecting lines n−5 to n+4 at 902*b*, the data signals from the date drivers are set to the relaxed voltage (Data-relax N) to discharge the LC cells being selected. After this setting period, the next scan signal is a single pulse selection to address line n-r+2 with image data, and the data signals from the data driver resume to the normal image data (Data out n-r+2) for displaying image. As the image data addressing proceeds and completes for the leading section of this group at the time 904*b*, LED element N−1 is turned on at the time 903*b* and the image in the leading section of the lines in this group is visible. Subsequently, as the image addressing proceeds further and completes for the trailing section of the lines in this group at the time 905*b*, the LED element N is turned at the time 906*b* and the image in the trailing section is visible.

In another preferred embodiment, a device comprises:

a scan driver circuit comprising a plurality of output terminals for operating a liquid crystal display, wherein said scan driver operates to set SELECT signal to said output terminals successively according to a control timing to enable the liquid crystal cells connected thereto to receive image data, and to inhibit data transfer to said cells when said SELECT signal is absent; wherein said scan driver further comprises a recurring discharging operation according to a control signal; said discharging operation delivering a discharge signal at a section of or all of the scan driver output terminals at the same time or within a small fraction of an image frame refreshing cycle.

As described herein above, the operation of the display device may continue in a subsequent cycle for another input image data, which may be different from the previous input image data or repeating the same data, with all the operations and variations described above included or partially included in such subsequent operation cycle.

According to the description herein above, the present invention therefore discloses a preferred method of operating a display device where the display device comprises: a plurality of light emitting elements; a plurality of LC cells modulating light output from said light emitting elements; a control circuit performing recurring operations on said light emitting elements and said LC cells; said control circuit operates to address image data to said LC cells. Such preferred method comprises recurring operations:

1) setting a light emitting elements to off or a dimming state;

2) setting a LC cell illuminated by said light emitting element to a relaxed state;

wherein in a refreshing operation cycle, said operation 1) precedes or overlaps operation step 2).

According to the description herein above, the present invention also provide a preferred embodiment of a method of operating a display device; said display device comprising: a plurality of light emitting elements; a plurality of LC cells modulating light output from said light emitting elements to produce images according to input image signals; said method comprising setting said LC cells according to the input image signals to produce said images; wherein, between two settings of said LC cells according to the input image signals where the subsequent image data may be different from or repeating the same of the previous image data, said method further comprising:

1) setting a light emitting elements to off or a dimming state;

2) setting an LC cell illuminated by said light emitting element to a relaxed state.

In a preferred embodiment, the operations or parts of the operations are programmed into an integrated circuit (IC). Such IC comprises the circuit for performing such operations and may also include circuits for peripheral operations such as input and output, and image processing. The control circuit comprises said integrated circuit and is typically fabricated on a printed circuit board with other circuitry, or completely integrated in one IC. In further detail, such control circuit comprises at least a timing management or generating circuitry and control signal circuitry to provide clock and control signals to operate the light emitting element and the LC cells according to the sequences described herein above. Such circuit may be constructed by programming a logic array, or by designing or converting to an application specific IC.

Figure 10:
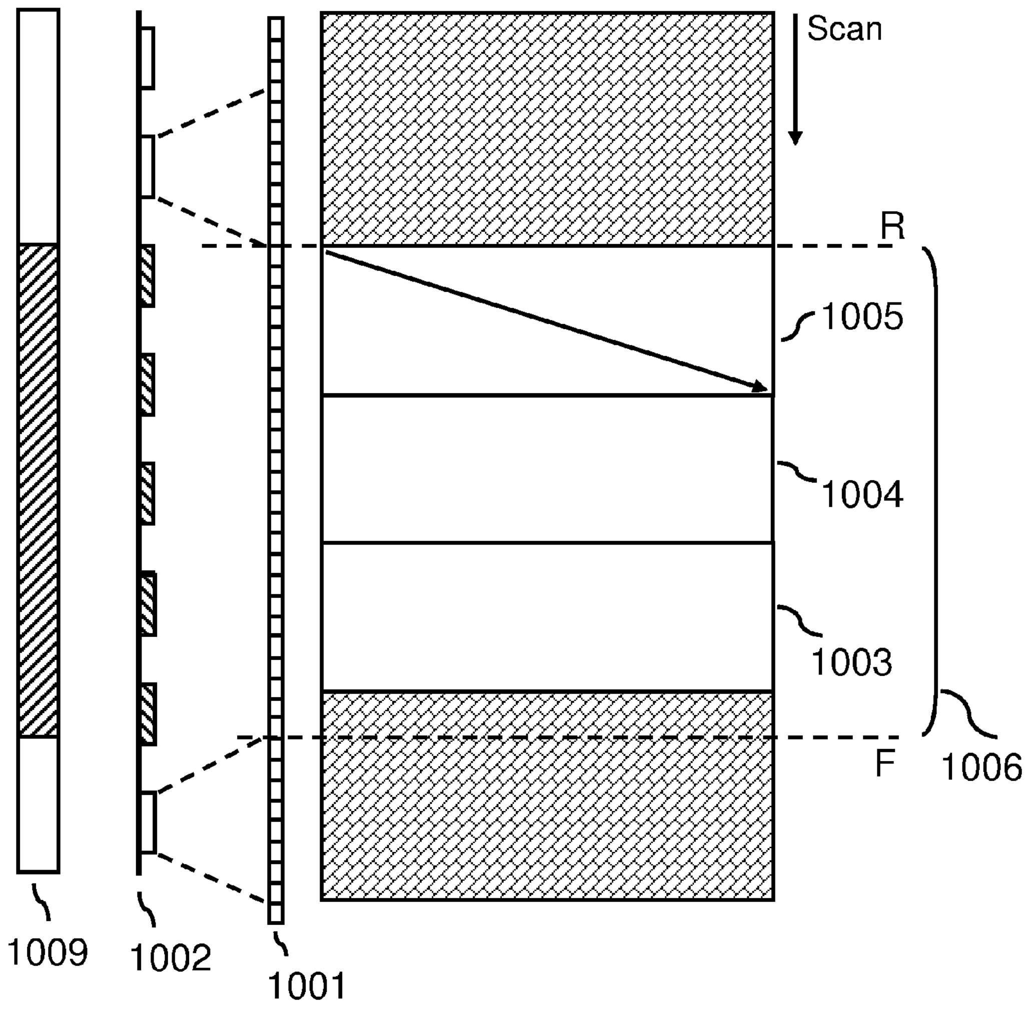
FIG. 10 is a schematic diagram of a preferred embodiment of the present invention showing the sequence of scanning.

FIG. 10 further illustrates the function and operation of the display apparatus of the present invention where 1002 is an array of LED elements, 1001 is an array of LC cells, 1009 indicates the display screen state (either on of off). In this illustration, LC section 1003, 1004, 1005 are set to the relaxed state, and where the LED elements illuminating these LC sections are set to off. Where it is not required that the LC cell sections (1003, 1004, 1005) have a one-to-one match to the LED elements (1006), all the LED elements that illuminate the sections of the LC in area 1006 that are set to the relaxed state need to remain in the off state.

Furthermore, as described in paragraphs 44 to 50, 62, 66, 67 and 69-72, the present invention comprises a control circuit and a drive circuit to enable the selection of all LCD lines in a group, as illustrated by area 105 of FIG. 1*a* and described in paragraph 34 and 35. A scan driver is so constructed and assembled with the display apparatus to operate to select all lines corresponding to the cells in area 105. Furthermore, a data driver is constructed and assembled in the display to deliver a data signal synchronously with the scan driver to set all data lines to a voltage state corresponding to the relaxed state of the LC cells.

A typical liquid crystal display comprises scan electrodes for selection and data electrodes for delivering image data to the LC cells. Each LC cell comprises a thin-film transistor (TFT) having a gate terminal and a data terminal (drain terminal of the TFT). A plurality of LC cells, typically a row of LC cells, are connected via the gate terminals to a scan electrode. Applying a SELECT signal on a scan electrode selects all cells connected thereto to receive image data from the data electrode.

A preferred embodiment of the scan driver circuit in the present invention comprises a plurality of output terminals for operating a liquid crystal display, wherein each output terminal operates to deliver a SELECT signal successively and cyclically according to a control timing to enable the liquid crystal cells connected thereto to receive image data, and to inhibit data transfer to said cells when said SELECT signal is absent or disabling; wherein said scan driver further comprises a recurring discharge operation according to a control signal. In a preferred embodiment, each said discharge operation operates on a section of the scan output terminals simultaneously, i.e., all terminals in a section are set to a discharging signal during said discharge operation, thereby performing discharge operation on all LC cells connected to said section of the scan output terminals. In an alternative embodiment, all scan terminals are operating discharge simultaneously each time, thereby performing discharge operation on all LC cells in the display together. In another alternative embodiment, the discharge operation is performed one scan terminal at a time sequentially.

A preferred embodiment of the discharge signal of the scan driver is a SELECT signal that enables the LC cells to receive the discharge voltage form the data driver output. Another preferred embodiment is a discharge voltage delivered by a section of the output terminals of the scan driver that set the LC cells connected thereto to a discharge voltage regardless of the data voltage.

A preferred discharge operation comprises delivering a discharge signal at said section of or all output terminals simultaneous. A preferred discharge signal is a signal the select all cells connected thereto to receive a discharge data voltage from the data electrodes. Such a signal is preferably the same as the SELECT signal. The scan driver described here may be constructed in an integrated circuit on silicon.

The present invention further provides a driver circuit comprising the scan driver and a data driver circuit for delivering image data to its data output terminals according to the input image signal; wherein during said discharging operation, output terminals of said data driver are set to a discharge voltage according to a control signal.

Another preferred embodiment of the driver circuit in the present invention operates a recurring function comprising:

1) setting all data output terminals to a discharging voltage;

2) enabling all scan output terminals;

3) disabling all scan output terminals;

4) setting data output terminals according to input image signal;

5) enabling a scan output terminals;

6) repeating step 4 and 5 on another scan output terminal;

wherein in an operation cycle, operation 1) precedes or overlaps 2), 2) precedes 3), and 3) precedes 4). Such driver circuit may be constructed in a single chip integrated circuit.

FIGS. 11 and 12 illustrate the function of the scan driver circuit described in the preceding paragraph. FIG. 11 is the conventional driver for scan-select. FIG. 12 provides the driver with an additional control signal, “act all”, and the additional function in the last row, where when act all is set to enable (H), all output terminals are set to enable state (H). The enabling of “act all” and the enable states of the output terminal can be either high or low, depending on the logic and drive configuration.

Accordingly, the present invention provides an integrated driver circuit comprising a data driver circuit for delivering image data to its data output terminals according to the input image data, a scan driver for successively enabling its scan output terminals; wherein said scan driver further comprises a recurring discharge operation according to a control signal. Such discharge operation enables a plurality of scan output terminals simultaneously at a defined time according to the control signal; wherein during said discharging operation, output terminals of said data driver are set to a discharge voltage according to a control signal. Such integrated driver circuit is preferably made in a single silicon chip. In an alternative implementation of such driver circuit, a conventional driver is used to connect external pull-up or pull down circuit that active all the output terminals via a separate section of external circuitry.

Accordingly, another preferred embodiment of the present invention is the display apparatus comprises an integrated driver circuit described in the previous paragraph which operates a recurring function comprising:

1. setting all data output terminals to a discharging voltage;
2. enabling all scan output terminals;
3. disabling all scan terminals;
4. setting data output terminals according to image data;
5. enabling a scan output terminals;
6. repeating step 4 and 5 on another scan output terminal;

wherein in an operation cycle, operation 1 precedes or overlaps 2, or trails 2 by a fraction of the response of the LC cells, 2 precedes 3, and 3 precedes 4.

An example of the application of the present invention is the handheld apparatus, such as a cellphone, comprising the integrated driver circuit according to previous paragraph and a display device, said display device comprising a plurality of light valves connected to said integrated driver; wherein said plurality of light valves are structured into a plurality of subsets, each subset comprising a group of light valves; wherein a scan output terminal controlling the selection of a said subset for receiving said data; wherein said integrated driver further sets a plurality of said subsets to a relaxed state during said discharging operation.

Various structures may be used to achieve the function of the circuit operation and timing scheme of the display disclosed in the present invention. Specific preferred embodiments of its construction were provided in this description to illustrate the driving scheme, operation principles, and functional definition of the driver, of this invention. The application of the principles of the present invention, however, is not limited by such examples. It is conceivable that various types of circuit implementation and cell assembly may be used to construct such display operate under the principles of the present invention. All such variations are embraced by the present invention.

It is construed that the above structural illustration does not limit the scope of the present invention. For example, a single control circuit IC may comprise multiple control programs to control both rows and columns, or comprises both LED control programs and the image processing of data for LCD control. Furthermore, it is construed that the present invention is not limited by the type, shape, or the arrangement of the light source, lighting elements, and the LC cells. Examples of variations include: the arrangement of LCD cell elements being arranged in a non-orthogonal arrangement; the LED elements being arranged with multiple colors or comprising multiple LEDs in one unit; the LED elements being arranged on one side of the display and illuminates on the LCD cells via a light guide.

Although various embodiments utilizing the principles of the present invention have been shown and described in detail, it is perceivable those skilled in the art can readily devise many other variances, modifications, and extensions that still incorporate the principles disclosed in the present invention. The scope of the present invention embraces all such variances, and shall not be construed as limited by the number of elements, specific arrangement of groups as to rows and column, and specific circuit embodiment to achieve the architecture and functional definition of the present invention.

What is claimed is:

1. A display device comprising:

a plurality of light emitting elements;

a light modulator comprising a plurality of light valves modulating light directed thereto;

a data electrode for applying data voltages to said light valves;

a control circuit comprising circuits connected to said light emitting elements and light valves and having a timing sequence that generates and applies multiple recurring control signals to said light emitting elements and said light valves according to said timing sequence;

said multiple recurring signals comprising:

1) a signal timing period starting with a first control signal that sets a light valve to a transmission state, and ending at a subsequent second control signal that sets to decrease the transmission of said light valve; wherein between said first and said second control signals, no intervening signal disrupts the setting of said light valve;

2) a third control signal setting to decrease the light intensity of a light emitting element illuminating said light valve of 1), and subsequently a fourth control signal to increase said light intensity; no intervening signal between said third and fourth control signals to increase the light intensity of said light emitting element; wherein said third control signal is no later than said first signal;

wherein said second signal is no later than said fourth signal no intervening image frame cycle setting the transmission of said light valve to increase and subsequently decrease between said second and said fourth control signals; no intervening image frame cycle between said third and said first control signals that sets the transmission of said light valve to increase and subsequently sets to decrease.

2. The display device according to claim 1, comprising:

a plurality of light emitting elements;

a light modulator comprising a plurality of light valves modulating light directed thereto;

a data electrode for applying data voltages to said light valves; a control circuit comprising circuits connected to said light emitting elements and light valves and having a timing sequence that generates and applies multiple recurring control signals to said light emitting elements and said light valves according to said timing sequence; said multiple recurring signals comprising:

1) a signal timing period starting with a first control signal that sets a light valve to increase the transmission to a higher transmission state, and ending at a subsequent second control signal that sets to decrease the transmission of said light valve; no intervening signal to disrupt the setting of said light valve between said first and said second control signals;

2) a third control signal setting a light emitting element that illuminates said light valve to the dimming state which corresponds to minimum light intensity, and subsequently a fourth control signal to increase the light intensity of said light emitting element; no intervening signal to disrupt the setting of said light emitting element between said third and fourth control signals; wherein said third control signal is applied no later than said first signal;

3) a signal setting wherein said light emitting element remains in the dimming state for the entire time in said signal period after being set by said third signal; wherein said second signal is no later than said fourth signal; no intervening image frame cycle between said second and said fourth control signals that sets to increase and subsequently sets to decrease the transmission of said light valve; no intervening image frame cycle between said third and said first control signals that sets to increase and subsequently decrease the transmission of said light valve.

3. The device according to claim 2, comprising:

a plurality of light emitting elements;

a light modulator comprising a plurality of light valves modulating light directed thereto;

a data electrode for applying data voltages to said light valves; a control circuit generating and applying recurring control signals to said light emitting elements and said light valves according to a timing sequence; said recurring control signals comprising:

1) a control signal s1 setting a light emitting element to a dimming state;

2) a control signal s2 setting a light valve in the area illuminated by said light emitting element to a relaxed state which corresponds to setting said light valve to a transmission state, and a subsequent control signal s3 to set said light valve to decrease the transmission to a lower transmission state; no intervening signal disrupting the setting of said light valve between s2 and s3;

wherein in a recurring time period ending at s3, said signal s1 setting dimming state occurs before said light valve changes its optical state to the transmission state by signal s2;

wherein said light emitting element remains in the dimming state from the time of s1 to the time of s3; wherein the recurring control signals in 1) and 2) are within the operation time of one frame.

4. The device according to claim 1, wherein said control circuit generates and applies recurring control signals to said light emitting elements and light valves according to said timing sequence; said signal s3 setting said light valve to decrease transmission to a state according to an input image data point to produce image; wherein the light emitting element that is set to the dimming state by signal s1 remains in the dimming state after signal s1 the entire time until applying the signal S3L wherein in an image frame cycle, s2 precedes s3.

5. The display device according to claim 4, wherein said recurring control signals comprise 4) a signal s5 setting the light emitting element that has been set to dimming state by said signal s1 to a bright level according to a scaling relation; said scaling relation determining said brightness level in a manner that the brightness level increases or decreases according to the average or maximum brightness of the image in an area surrounding said light valve; said scaling relation provides a brightness level that increases with increasing average or maximum brightness for at least a third of the gray scale range; wherein said signal s3 is no later than said signal s5.

6. The device according to claim 1 wherein said control circuit generates and applies recurring control signals to said light emitting elements and light valves according to said timing sequence;

the control signals further comprising: 4) signal s4 setting said light emitting element that has been set to a dimming state by said signal s1 to a bright state; wherein in an operation signal cycle starting with signal s1, signal s3 is no later than signal s4.

7. The device according to claim 1, wherein said plurality of light valves and said light emitting elements are arranged separately in plurality of groups; wherein said control circuit generates signals and applies signals to said light emitting elements and light valves according to said timing sequence in which the groups of light valves are set in coordination with the groups of light emitting elements such that said signal s1 is applied on a group of light emitting elements simultaneously, setting the light emitting elements in the group to a dimming state at the same time, and said signal s2 is applied on a group of light valves in the area illuminated by said group of light emitting elements to set all light valves in said group of light valves to a transmission state at the same time;

wherein in a recurring operation time period ending at s3, said s1 precedes or overlaps said s2.

8. The device according to claim 1, wherein said signal s1 sets a section of the light emitting elements to a dimming state, and wherein said signal s2 sets a section of light valves to a higher transmission state; wherein in a recurring time cycle ending at s3, said signal s1 is no later than s2.

9. The device according to claim 1, wherein a group of light valves are illuminated by a subset of light emitting elements, and wherein said group of light valves are arranged to connect to a first common electrode, and wherein said control circuit generates and applies signals according to said timing sequence in which said control signal s2 for setting a light valve is applied via said first common electrode on said group of light valves, wherein said control signal s2 sets said group of light valves to increase transmission.

10. The device according to claim 9, wherein said common electrode connects to all light valves of the display, and wherein said control signal s2 for setting a light valve is applied on all light valves by applying a voltage via said common electrode, setting all light valves to a transmission state.

11. The device according to claim 1, wherein a group of said light emitting elements is arranged to connect to a second common electrode, wherein said circuit generates and applies signals according to said timing sequence in which signal s1 is applied on the group of light emitting elements by applying a control voltage to the second common electrode.

12. The display according to claim 1, wherein said setting said light valve to a transmission state corresponds to setting to decrease the magnitude of the voltage on the light valve.

13. The display according to claim 1, wherein said plurality of light valves form an array of cells; said control circuit comprising at least a data driver circuit applying image data to said light valves, and at least a scan driver circuit selecting light valves to receive the image data according to a control timing sequence; wherein said scan driver comprising a plurality of output terminals each connecting to a group of light valves via a scan electrode; wherein said scan driver generates and applies recurring control signal d1 that sets a group of said scan driver output terminals simultaneous so that all light valves connected to said group of scan driver output terminals are set at the same time to receive voltage signals from said data driver during the time of signal d1 to reduce the voltage.

14. The display according to claim 13, wherein said data driver generates and applies signals to said light valves according to said timing sequence to deliver a voltage signal v1 at its data output terminals in the period when said scan driver applies said signal d1; said voltage signal v1 setting the light vales to decrease the magnitude of voltage toward zero or near zero.

15. The display device according to claim 1, wherein said plurality of light emitting elements are arranged in N groups; wherein the control signal s1 sets all light emitting elements in a group to a dimming state; wherein the area of the light valves under the illumination of said group of light emitting elements is smaller than 4 A/N; where A is the total surface area of said light modulator comprising a plurality of light valves.

16. The display device according to claim 1, wherein a said light valve is a liquid crystal (LC) cell or a MEMS cell.

17. The device according to claim 2, wherein said first control signal sets said light valve to maximum transmission.

18. A device comprising:

a timing control circuit comprising circuit and a timing sequence that generates recurring control signals;

a scan driver circuit comprising a plurality of output terminals wherein each terminal connects to a plurality of light valves of a liquid crystal display, a voltage setting circuit;

wherein said scan driver comprises circuit that sets sequential SELECT signals to said output terminals, one terminal at a time, successively according to said timing sequence to enable the liquid crystal light valves connected thereto to receive image data, and to inhibit data transfer to said light valves when said sequential SELECT signal is absent; wherein said scan driver further comprises circuit that generates and applies recurring simultaneous SELECT signals to a SECTION comprising a plurality of the output terminals simultaneously, wherein a said simultaneous SELECT signal enables all light valves connected to said SECTION of output terminals to receive voltage signals at the same time;

wherein within the time of one frame, the simultaneous SELECT signal is set once to all said terminals at the same time, whereas said sequential SELECT signal is set to each and every output terminal once, successively, after said simultaneous SELECT signal;

wherein the voltage setting of a light valve is not affected by any signals in the absence of the SELECT signal;

wherein, during the time when a simultaneous SELECT signal is applied to said SECTION, said voltage setting circuit delivers voltage signals to all light valves connected to said SECTION to decrease the voltage of the light valves;

wherein said simultaneous SELECT signal is followed by a plurality of said sequential SELECT signals applied to the terminals in said SECTION sequentially;

wherein during said sequential SELECT signals, at least one light valve connected to said SECTION is set to increase voltage;

wherein said device further comprises a lighting control circuit connected to a plurality of light emitting elements;

wherein said lighting control circuit generates lighting control signals synchronized with said timing control circuit to set the intensity of said light emitting elements;

wherein no later than said simultaneous SELECT signal applied to said SECTION, said lighting control circuit sets lighting control signals to decrease the intensity of a group of light emitting elements that illuminate the light valves connected to said SECTION;

wherein after said simultaneous SELECT signal, no intervening signal sets said group of light emitting elements to increase the light intensity until at least a sequential SELECT signal is applied to said SECTION;

wherein said lighting control circuit sets said group of light emitting elements to increase light intensity after at least a sequential SELECT signal is applied at an output terminal of said SECTION;

wherein, between said simultaneous SELECT signal and said increase light intensity, the sequential SELECT signal is applied no more than once at any output terminal of said SECTION.

19. The device according to claim 18, further comprising:

a timing control circuit comprising circuit and a timing sequence that generates recurring control signals;

a scan driver circuit comprising a plurality of output terminals wherein each terminal connects to a plurality of light valves of a liquid crystal display, a voltage setting circuit;

wherein said scan driver comprises circuit that sets a sequential SELECT signal to said output terminals, one terminal at a time, successively according to said timing sequence to enable the liquid crystal light valves connected thereto to receive image data, and to inhibit data transfer to said light valves when said sequential SELECT signal is absent;

wherein said scan driver further comprises circuit that generates and applies recurring simultaneous SELECT signals to a SECTION comprising a plurality of the output terminals simultaneously;

wherein a said simultaneous SELECT signal sets all light valves connected to said SECTION of output terminals to receive voltage signals at the same time; wherein, during the time when a simultaneous SELECT signal is applied to said SECTION, said voltage setting circuit delivers voltage signals to all light valves connected to said SECTION to decrease the voltage of the light valves to zero or near zero voltage; wherein said simultaneous SELECT signal is followed by said sequential SELECT signals applied via the terminals in said SECTION sequentially; wherein during said sequential SELECT signals, at least one light valve connected to said SECTION is set to a non-zero voltage;

wherein said device further comprises a lighting control circuit connected to a plurality of light emitting elements; wherein said lighting control circuit generates lighting control signals synchronized with said timing control circuit to set the intensity of said light emitting elements;

wherein no later than said simultaneous SELECT signal applied to said SECTION, said lighting control circuit sets to decrease the intensity of a group of light emitting elements that illuminate the light valves connected to said SECTION to minimum intensity; wherein after said decrease of the intensity, no intervening signal increases the light intensity of said group of light emitting elements until at least one light valve connected to said SECTION is set to a non-zero voltage.

20. The device according to claim 19, further comprising:

a data driver circuit comprising a plurality of data output terminals for delivering voltage signals to said liquid crystal display;

wherein during said simultaneous SELECT signal, all the output terminals of said data driver are set to zero voltage.

21. The device according to claim 20, further comprises circuit that generates and applies recurring control signals comprising:

1). signals setting a plurality of data output terminals to zero or near zero voltage;

2). a simultaneous SELECT signal applied via t-o a plurality of scan output terminals simultaneously;

3). a signal setting a data output terminal within said plurality of data output terminals to a voltage of magnitude higher than zero;

4). a sequential SELECT signal applied via scan output terminals within said plurality of scan output terminals;

5). repeating signals of 3), and repeating signal of 4) for said plurality of scan output terminals successively;

wherein signals of 1), 2), 3), and 4) are in time sequence.

22. The device according to claim 18, further comprising a voltage setting circuit wherein said voltage setting circuit sets all light valves connected to said SECTION to zero voltage during the time of said simultaneous SELECT signal; wherein said all light valves remain being set to zero voltage until subsequently a sequential SELECT signal is applied to a light valve via a scan driver output terminal connected thereto.

23. An image display device comprising:

a plurality of light emitting elements and a plurality of light valves;

a circuit supplying current to a light emitting element, and supplying voltage signals to a plurality of light valves;

wherein each light valve being illuminated by at least a light emitting element, wherein said circuit generates and applies multiple recurring control signals according to a recurring signal timing sequence;

said timing sequence comprising:

1) a first control signal at time t1 to decrease the current of a light emitting element illuminating a light valve, and a subsequent fourth control signal at time t4 to increase the current of said light emitting element; wherein no intervening signal that increases the current of said light emitting element between said first and fourth control signals;

2) a second control signal at time t2 that sets to lower the magnitude of voltage of a light valve illuminated by said light emitting element in 1), and subsequently a third control signal at time t3 that sets to increase the magnitude of voltage of said light valve; wherein between said second and third control signals, no intervening signal disrupts the setting of said light valve; no intervening image frame cycle between said third and said fourth control signals that sets the voltage transmission of said light valve lower and subsequently sets higher decrease during the time;

3) wherein in a timing period ending at said fourth signal timing t4, the timing t1 is no later than said light valve changing its voltage set by signal at t2, said third control signal timing t3 is no later than said signal timing t4; no intervening image frame cycle between said first and said second control signals that sets the voltage of said light valve lower and subsequent sets higher.

24. The image display device according to claim 23, comprising a plurality of light emitting elements and a plurality of light valves, a circuit supplying current to a light emitting element, and supplying voltage signals to a plurality of light valves, wherein said circuit generates and applies multiple recurring control signals according to a recurring signal timing sequence; said timing sequence comprising:

1) a first control signal to decrease the current of a light emitting element to the minimum current, and a subsequent fourth control signal to increase the current of said light emitting element;

2) a second control signal that sets to lower the magnitude of voltage of a light valve in the area illuminated by said light emitting element of 1), and subsequently a third control signal that sets to increase the magnitude of voltage of said light valve;

3) no intervening signal that increase the current of said light emitting elements illuminating said light valve in 2) in the entire period between said second control signal and said third control signal;

4) wherein in a timing period beginning at said first control signal, said third control signal is no later than said fourth control signal;

wherein between said third and said fourth control signals, no intervening signal cycle that sets the transmission of said light valve to increase and subsequently decrease;

wherein the recurring signals in 1) and 2) are within the operation time of one frame.

25. The device according to claim 24, wherein said second control signal that decreases the voltage of said light valve reduces the voltage of said light valve to zero or near zero.

26. The device according to claim 24, comprising a signal cycle setting said light valve to a positive voltage not later than said first control signal and said second control signal;

wherein said second control signal decreases the magnitude of the voltage of said light valve by delivering to said light valve a negative voltage, so to neutralize said light valve to a lower magnitude voltage; wherein said light valve is LC cell.

27. A method of operating a display device, said display device comprising:

a plurality of light emitting elements;

a plurality of light valves modulating light directed thereto from said light emitting elements;

said method comprising applying multiple recurring signals to operate said display device according to a timing sequence:

1) applying a first signal setting a light emitting element to decrease the light intensity;

2) applying a second signal setting a light valve illuminated by said light emitting element in 1) to a transmission state, and subsequently applying a third signal to decrease transmission of said light valve; wherein no intervening signal sets said light valve between said second signal and said third signal; wherein said first signal is applied no later than said light valve changing to said transmission state;

3) applying a fourth signal to increase the intensity of said light emitting element after said third signal; wherein no intervening signal increases the light intensity of said light emitting element after said first signal until said fourth signal; no intervening full image frame operation cycle between said third signal and said fourth signal that sets the transmission of said light valve to increase and subsequently sets to decrease; no intervening image frame operation cycle that sets the transmission of said light valve to increase and subsequently decrease between said first and said second signals.

28. The method of operating a display device according to claim 27, said display device comprising: a plurality of light emitting elements; a plurality of light valves modulating light directed thereto from said light emitting elements; said method comprising applying multiple recurring signals to operate said display device according to a timing sequence, said method comprising:

1) applying a first signal setting a light emitting element to a dimming state;

2) applying a second signal setting a light valve illuminated by said light emitting element in 1) to a transmission state, and subsequently applying a third signal to decrease transmission of said light valve; no intervening signal decreasing the transmission of said light valve after said second signal until said third signal; wherein said first signal is applied before said light valve changing to said transmission state;

3) applying a fourth signal to increase the intensity of said light emitting element after said third signal; no intervening signal setting said light emitting element after said first signal until said fourth signal;

wherein said light emitting element is set to, and remains in, the dimming state until said fourth signal;

wherein the signals in 1), 2) and 3) are applied within the operation time of one frame.

29. The method according to claim 28, comprising recurring operations of:

1) applying a first signal setting a light emitting element to a dimming state, which corresponds to minimum light intensity of said light emitting elements in said display device;

2) applying a second signal which sets a light valve illuminated by said light emitting element to increase transmission to a higher transmission state;

3) applying a third signal after said second signal to decrease the transmission of said light valve; wherein said light emitting element remains in the dimming state in the entire period between said second signal and said third signal; wherein said light emitting element is set to increase light intensity after said third signal;

wherein operations 1), 2) and 3) are within 30 milliseconds.

* * * * *